US012657082B2

(12) United States Patent
Ruan

(10) Patent No.:  US 12,657,082 B2
(45) Date of Patent:    Jun. 16, 2026

(54) INFORMATION TRANSMISSION METHOD, CONTROL APPARATUS, ELECTROMAGNETIC SIGNAL TRANSCEIVER APPARATUS, AND SIGNAL PROCESSING DEVICE

(71) Applicant: Yinwang Intelligent Technologies Co., Ltd., Shenzhen (CN)

(72) Inventor:  Hongchao Ruan, Shenzhen (CN)

(73) Assignee: Yinwang Intelligent Technologies Co., Ltd., Shenzhen (CN)

( * ) Notice:  Subject to any disclaimer, the term of this patent is extended or adjusted under 35 U.S.C. 154(b) by 186 days.

(21) Appl. No.: 18/307,325

(22) Filed:  Apr. 26, 2023

(65) Prior Publication Data

US 2024/0291705 A1    Aug. 29, 2024

Related U.S. Application Data

(63) Continuation of application No. PCT/CN2020/125435, filed on Oct. 30, 2020.

(51) Int. Cl.
*G06F 11/07*       (2006.01)
*G06F 11/16*       (2006.01)
(Continued)

(52) U.S. Cl.
CPC ...... *G06F 11/0784* (2013.01); *G06F 11/1625* (2013.01); *H04L 41/0627* (2013.01); *H04L 41/0681* (2013.01); *G06F 11/0766* (2013.01)

(58) Field of Classification Search
CPC ............. H04L 41/0627; H04L 41/0681; G06F 11/1625; G06F 13/24; G06F 13/4282;
(Continued)

(56) References Cited

U.S. PATENT DOCUMENTS 5,515,380 A * 5/1996 Giger ........................ H04L 1/22
                                                714/701
6,292,774 B1* 9/2001 Taori ....................... G10L 19/06
                                                704/E19.024
(Continued)

FOREIGN PATENT DOCUMENTS

CN        102555994 A    7/2012
CN        109655714 A    4/2019
(Continued)

OTHER PUBLICATIONS

Extended European Search Report in European Appln No. 20959242. 7, dated Oct. 25, 2023, 10 pages.

(Continued)

*Primary Examiner* — Steve N Nguyen
(74) *Attorney, Agent, or Firm* — Fish & Richardson P.C.

(57)           ABSTRACT

Example information transmission methods, control apparatuses, electromagnetic signal transceiver apparatuses, and signal processing devices are disclosed. One example information transmission method is applied to a control apparatus that includes a first processor and a second processor. The example information transmission method includes obtaining first fault information of an electromagnetic signal transceiver apparatus by the first processor through a first channel. Second fault information of the electromagnetic signal transceiver apparatus is obtained by the second processor. The second fault information is from the electromagnetic signal transceiver apparatus and is transmitted through a second channel. The first fault information corresponds to a first fault, and the second fault information corresponds to a second fault.

20 Claims, 10 Drawing Sheets

(51) Int. Cl.
H04L 41/0604 (2022.01)
H04L 41/0681 (2022.01)

(58) Field of Classification Search
CPC ............... G06F 13/382; G06F 11/0766; G06F 11/4072; G06F 11/0784; G01S 7/003; G01S 7/40; G01S 13/931; G01S 13/87; G01S 7/02; G01S 13/02; Y02P 90/02
See application file for complete search history.

(56) References Cited

U.S. PATENT DOCUMENTS

| | | | | |
|---|---|---|---|---|
| 7,254,749 | B2 * | 8/2007 | Abrahams | H04L 43/0817 710/18 |
| 2004/0213253 | A1 * | 10/2004 | Evans | H04L 49/3081 370/539 |
| 2007/0042722 | A1 * | 2/2007 | Kim | H04L 5/16 455/73 |
| 2012/0330501 | A1 * | 12/2012 | Sundaram | G05B 23/0248 701/33.9 |
| 2013/0156417 | A1 * | 6/2013 | Chou | H04B 10/40 398/5 |
| 2018/0239663 | A1 | 8/2018 | Miki | |
| 2020/0065185 | A1 * | 2/2020 | Mayer | G11C 29/028 |
| 2020/0070847 | A1 | 3/2020 | Horiguchi et al. | |
| 2020/0339140 | A1 | 10/2020 | Lin et al. | |
| 2021/0133028 | A1 * | 5/2021 | Kim | G06F 11/1048 |

FOREIGN PATENT DOCUMENTS

| | | |
|---|---|---|
| JP | 2017533432 A | 11/2017 |
| JP | 2019132838 A | 8/2019 |
| JP | 2019206337 A | 12/2019 |
| WO | 2019205724 A1 | 10/2019 |

OTHER PUBLICATIONS

Office Action in Japanese Appln. No. 2023-526334, mailed on Apr. 23, 2024, 6 pages (with English translation).
Office Action in Canadian Appln. No. 3,197,021, mailed on Apr. 11, 2025, 4 pages.

* cited by examiner

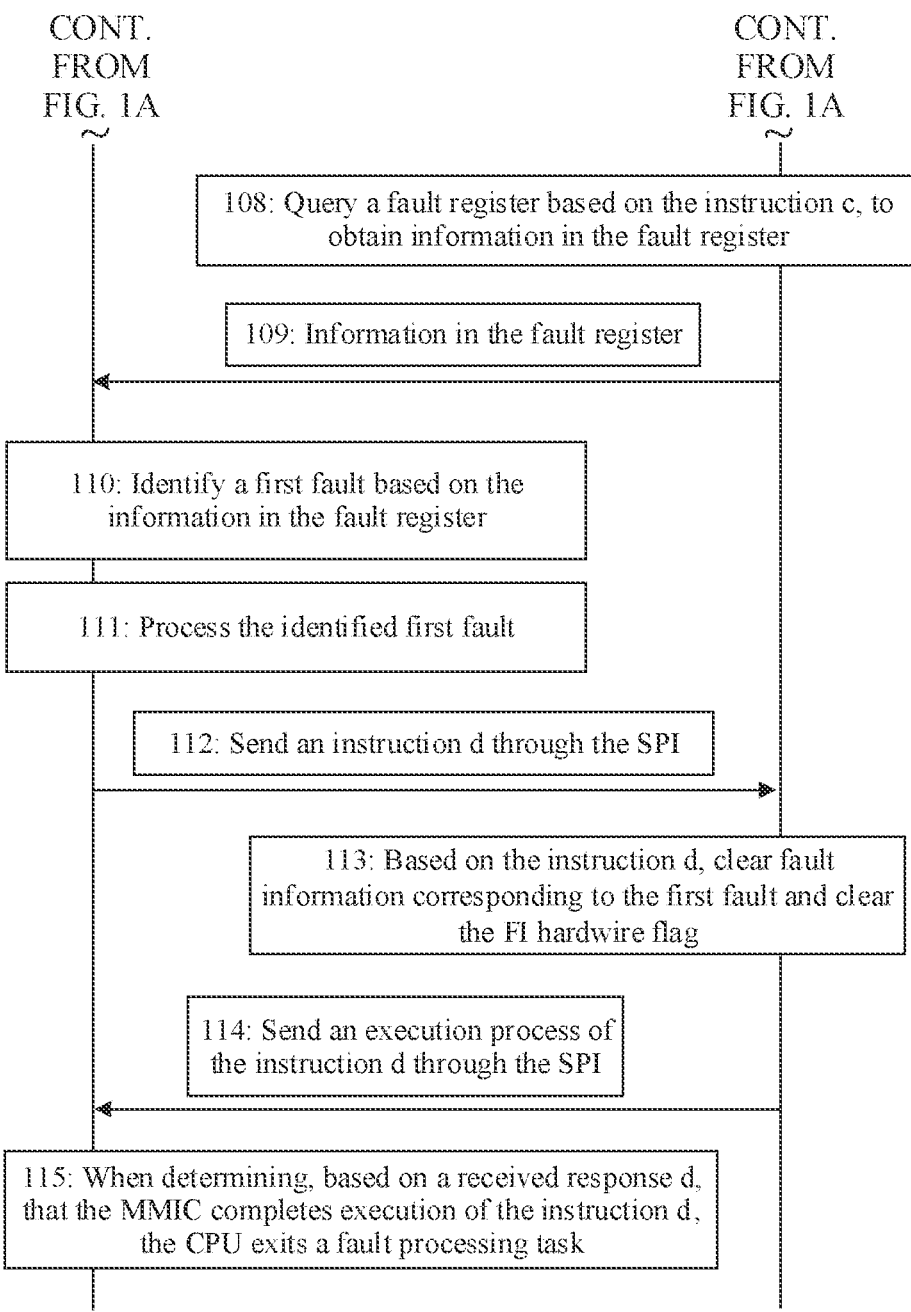

CONT.
FROM
FIG. 1A

CONT.
FROM
FIG. 1A

108: Query a fault register based on the instruction c, to
obtain information in the fault register 109: Information in the fault register 110: Identify a first fault based on the
information in the fault register 111: Process the identified first fault 112: Send an instruction d through the SPI 113: Based on the instruction d, clear fault
information corresponding to the first fault and clear
the FI hardwire flag 114: Send an execution process of
the instruction d through the SPI 115: When determining, based on a received response d,
that the MMIC completes execution of the instruction d,
the CPU exits a fault processing task

FIG. 1B

INFORMATION TRANSMISSION METHOD, CONTROL APPARATUS, ELECTROMAGNETIC SIGNAL TRANSCEIVER APPARATUS, AND SIGNAL PROCESSING DEVICE

CROSS-REFERENCE TO RELATED APPLICATIONS

This application is a continuation of International Application No. PCT/CN2020/125435, filed on Oct. 30, 2020, the disclosure of which is hereby incorporated by reference in its entirety.

TECHNICAL FIELD

This application relates to the field of information transmission technologies, and in particular, to an information transmission method, a control apparatus, an electromagnetic signal transceiver apparatus, and a signal processing device.

BACKGROUND

A millimeter-wave radar system has attracted more and more attention due to low costs and a mature technology. The millimeter-wave radar system has but is not limited to the following advantages: A bandwidth is large, frequency domain resources are rich, and an antenna side lobe is low, which are conducive to implementation of imaging or quasi-imaging. A wavelength is short, so that a size of a radar device and an antenna diameter can be decreased, and a weight can be reduced. A beam is narrow, and a beam of a millimeter wave is much narrower than a beam of a microwave in a case of a same antenna size, so that radar resolution is high. The millimeter-wave radar system has strong penetration and has a stronger capability of penetrating smoke, dust, and fog than a laser radar and an optical system, and can work throughout the day. Based on the advantages of the millimeter-wave radar system, the millimeter-wave radar system has been widely applied to a plurality of fields, for example, the vehicle-mounted field. A wavelength of a millimeter wave ranges from 1 millimeter (mm) to 10 millimeters, and a corresponding frequency range is from 30 gigahertz (GHz) to 200 gigahertz. Therefore, in this frequency band, a millimeter wave-related feature is very suitable for the vehicle-mounted field. Generally, frequencies of a vehicle-mounted millimeter-wave radar system are 24 GHz and 77 GHz.

Fault processing in an electrical and electronic system in the vehicle-mounted millimeter-wave radar system is indispensable. Fault behavior of the electrical and electronic system is mainly caused by a random hardware failure and a system failure. Random hardware failures are further classified into a single-point failure, a dual-point failure (or referred to as a dual-point fault), and a multi-point failure (also referred to as a security failure) including a three-point failure. The dual-point failure means two faults occurred in a same task periodicity, and the three-point failure means three faults occurred in a same task periodicity. A probability that the multi-point failure including the three-point failure occurs is very low, and therefore the failure basically can be ignored. For the dual-point failure, a new fault cannot be processed in time, which may cause a short circuit of a system, occurrence of incorrect data, or the like.

SUMMARY

This application provides an information transmission method, a control apparatus, an electromagnetic signal transceiver apparatus, and a signal processing device, to process each fault in a dual-point fault in time.

According to a first aspect, this application provides an information transmission method. The method may be applied to a control apparatus, and the control apparatus may include a first processor and a second processor. The method may include: The first processor obtains first fault information of an electromagnetic signal transceiver apparatus through a first channel, and the second processor obtains second fault information that is from the electromagnetic signal transceiver apparatus and that is transmitted through a second channel, where the first fault information corresponds to a first fault, and the second fault information corresponds to a second fault.

Based on the solution, the first processor may obtain the first fault information through the first channel, and the second processor may obtain the second fault information through the second channel. In this way, the first processor may process the first fault corresponding to the first fault information in time, and the second processor may process the second fault corresponding to the second fault information in time. In other words, the second processor may process the second fault simultaneously when the first processor processes the first fault, so that each fault in a dual-point fault can be processed in time.

In a possible implementation, the first channel may be a serial peripheral interface (serial peripheral interface, SPI), and/or the second channel may be a low voltage differential signaling (low voltage differential signaling, LVDS) channel.

Further, optionally, the first channel may be the SPI, and the second channel may be the LVDS channel.

A manner of sending the second fault information by multiplexing the LVDS channel is a heterogeneous redundancy manner, which helps avoid a case in which all communication channels fail because a single SPI communication manner is used.

In a possible implementation, the control apparatus may further include a first memory, the second fault information is stored in the first memory, and the second processor may obtain the second fault information from the first memory.

For example, the second processor may obtain the second fault information from the first memory in the following two possible implementations.

Implementation 1: The second processor periodically queries the first memory, and obtains the second fault information from the first memory.

Implementation 2: The second processor detects a second fault indication (fault indication, FI) hardwire flag, and obtains the second fault information from the first memory, where the second FI hardwire flag is used to indicate the second fault.

In Implementation 2, after the second processor detects the second FI hardwire flag, it indicates that the second fault has occurred. In this case, the second processor further obtains the second fault information from the first memory, which helps reduce power consumption of the second processor.

In a possible implementation, the second processor processes the second fault in response to at least one of uncompleted processing of the first fault, a first instruction, or detection of the second FI hardwire flag, where the first instruction is used to instruct the second processor to process the second fault.

For example, the second processor processes the second fault when determining that processing of the first fault is uncompleted and detecting the second FI hardwire flag.

In a possible implementation, the first processor detects a first FI hardwire flag, and sends the first instruction to the second processor, where the first instruction is used to instruct the second processor to process the second fault, and the first FI hardwire flag is used to indicate the first fault.

The first processor sends the first instruction to the second processor, so that the second processor can process the generated second fault in time. This helps avoid that the second processor cannot process the second fault in time because the second processor processes another task, thereby helping further improve processing efficiency of a dual-point fault.

In a possible implementation, the second processor sends a second instruction to the electromagnetic signal transceiver apparatus, where the second instruction is used to instruct the electromagnetic signal transceiver apparatus to clear the second FI hardwire flag and/or the second fault information.

The second FI hardwire flag and the second fault information that correspond to the second fault are cleared in time after the second processor completes processing of the second fault, so that a newly generated fault can be processed in time in a next task periodicity.

In a possible implementation, the first processor receives the first FI hardwire flag from the electromagnetic signal transceiver apparatus, where the first FI hardwire flag is used to indicate the first fault. When the first processor receives the first FI hardwire flag, it indicates that the first fault occurs in the electromagnetic signal transceiver apparatus. The first processor sends a first request message to the electromagnetic signal transceiver apparatus, where the first request message is used to request the first fault information. The first processor receives the first fault information from the electromagnetic signal transceiver apparatus through the first channel.

According to a second aspect, this application provides an information transmission method, and the method includes: An electromagnetic signal transceiver apparatus detects a first fault, and transmits first fault information to a control apparatus through a first channel, where the first fault information corresponds to the first fault; and the electromagnetic signal transceiver apparatus detects a second fault, and transmits second fault information to the control apparatus through a second channel, where the second fault information corresponds to the second fault.

Based on the solution, the electromagnetic signal transceiver apparatus may transmit different fault information (that is, the first fault information and the second fault information) to the control apparatus through two different channels (that is, the first channel and the second channel). This helps improve timeliness of transmitting fault information to the control apparatus by the electromagnetic signal transceiver apparatus, thereby helping further improve timeliness of processing each fault in a dual-point fault.

In a possible implementation, the first channel may be an SPI, and/or the second channel may be an LVDS channel.

Further, optionally, the first channel may be the SPI, and the second channel may be the LVDS channel.

A manner of sending the second fault information by multiplexing the LVDS channel is a heterogeneous redundancy manner, which helps avoid a case in which all communication channels fail because a single SPI communication manner is used.

In a possible implementation, the electromagnetic signal transceiver apparatus may transmit the second fault information to a first memory in the control apparatus through the second channel.

When the second fault occurs on the electromagnetic signal transceiver apparatus, the electromagnetic signal transceiver apparatus may transmit the second fault information to the first memory through the second channel. Herein, the electromagnetic signal transceiver apparatus may directly transmit the second fault information to the first memory without waiting for an instruction of a processor. This helps improve efficiency of transmitting the second fault information by the electromagnetic signal transceiver apparatus, thereby helping improve timeliness of processing the second fault.

In a possible implementation, the electromagnetic signal transceiver apparatus may send a second FI hardwire flag to a second processor in the control apparatus, where the second FI hardwire flag is used to indicate the second fault.

Further, optionally, when detecting the second fault, the electromagnetic signal transceiver apparatus may send, to the second processor in the control apparatus, the second FI hardwire flag used to indicate the second fault.

In a possible implementation, the electromagnetic signal transceiver apparatus may send a first FI hardwire flag to a first processor in the control apparatus, where the first FI hardwire flag is used to indicate that the first fault is generated.

Further, optionally, when detecting the first fault, the electromagnetic signal transceiver apparatus may send, to the first processor in the control apparatus, the first FI hardwire flag used to indicate that the first fault is generated.

The electromagnetic signal transceiver apparatus triggers the first FI hardwire flag when detecting the first fault, and triggers the second FI hardwire flag when detecting the second fault. In this way, after detecting the two faults, the electromagnetic signal transceiver apparatus can notify the control apparatus of both the faults in time, so that the control apparatus can process the faults in time.

In a possible implementation, the electromagnetic signal transceiver apparatus receives a second instruction from the second processor, and clears the second FI hardwire flag and/or the second fault information based on the second instruction.

The electromagnetic signal transceiver clears, in time, the second FI hardwire flag and/or the second fault information corresponding to the second fault, to prevent impact on a newly generated fault in a next task periodicity.

In a possible implementation, the electromagnetic signal transceiver apparatus may receive a first request message from the first processor in the control apparatus, and obtain the first fault information based on the first request message. For example, the electromagnetic signal transceiver apparatus may query a fault register based on the first request message, to obtain the first fault information from the fault register.

According to a third aspect, this application provides an information transmission apparatus or a control apparatus. The information transmission apparatus or the control apparatus is configured to implement any method in the first aspect or the first aspect, and includes corresponding functional modules that are separately configured to implement steps in the foregoing method. Functions may be implemented by hardware, or may be implemented by executing corresponding software by hardware. The hardware or software includes one or more modules corresponding to the foregoing functions.

The control apparatus includes a first processor, a second processor, a first interface circuit, and a second interface circuit. The first processor is configured to obtain first fault information of an electromagnetic signal transceiver apparatus by using the first interface circuit corresponding to a first channel, where the first fault information corresponds to a first fault. The second processor is configured to obtain second fault information of the electromagnetic signal transceiver apparatus, where the second fault information corresponds to a second fault, and the second fault information is from the electromagnetic signal transceiver apparatus and is transmitted by using the second interface circuit corresponding to a second channel.

In a possible implementation, the first channel is an SPI, and/or the second channel is an LVDS channel.

In a possible implementation, the control apparatus further includes a first memory, the second fault information is stored in the first memory, and the second processor is configured to obtain the second fault information from the first memory.

In a possible implementation, the second processor is configured to periodically query the first memory, and obtain the second fault information from the first memory.

In a possible implementation, the second processor is configured to detect a second FI hardwire flag, and obtain the second fault information from the first memory, where the second FI hardwire flag is used to indicate the second fault.

In a possible implementation, the second processor is further configured to process the second fault in response to uncompleted processing of the first fault, a first instruction, or detection of the second FI hardwire flag, where the first instruction is used to instruct the second processor to process the second fault.

In a possible implementation, the control apparatus further includes a third interface circuit. The first processor is further configured to detect a first FI hardwire flag, and send the first instruction to the second processor by using the third interface circuit, where the first instruction is used to instruct the second processor to process the second fault, and the first FI hardwire flag is used to indicate the first fault.

In a possible implementation, the second processor is further configured to send a second instruction to the electromagnetic signal transceiver apparatus by using the first interface circuit corresponding to the first channel, where the second instruction is used to instruct the electromagnetic signal transceiver apparatus to clear the second FI hardwire flag and/or the second fault information.

In a possible implementation, the first processor is configured to: receive the first FI hardwire flag from the electromagnetic signal transceiver apparatus by using a first FI hardwire pin, where the first FI hardwire flag is used to indicate the first fault; and send a first request message to the electromagnetic signal transceiver apparatus by using the first interface circuit corresponding to the first channel, where the first request message is used to request the first fault information.

Further, optionally, the first processor may be configured to receive the first fault information from the electromagnetic signal transceiver apparatus by using the interface circuit corresponding to the first channel.

According to a fourth aspect, this application provides an information transmission apparatus or an electromagnetic signal transceiver apparatus. The information transmission apparatus or the electromagnetic signal transceiver apparatus is configured to implement any method in the second aspect or the second aspect, and includes corresponding functional modules that are separately configured to implement steps in the foregoing method. Functions may be implemented by hardware, or may be implemented by executing corresponding software by hardware. The hardware or software includes one or more modules corresponding to the foregoing functions.

The electromagnetic signal transceiver apparatus includes a controller, a fourth interface circuit, and a fifth interface circuit. The controller is configured to detect a first fault, and transmit first fault information to a control apparatus by using the fourth interface circuit corresponding to a first channel, where the first fault information corresponds to the first fault. The controller is further configured to detect a second fault, and transmit second fault information to the control apparatus by using the fifth interface circuit corresponding to a second channel, where the second fault information corresponds to the second fault.

In a possible implementation, the first channel may be an SPI, and/or the second channel may be an LVDS channel.

Further, optionally, the first channel may be the SPI, and/or the second channel may be the LVDS channel.

In a possible implementation, the controller is configured to transmit the second fault information to a first memory in the control apparatus by using the fifth interface circuit corresponding to the second channel.

In a possible implementation, the controller is further configured to send a second FI hardwire flag to a second processor in the control apparatus by using a second FI hardwire pin, where the second FI hardwire flag is used to indicate the second fault.

Further, optionally, the controller is configured to: when detecting the second fault, send, to the second processor in the control apparatus by using the second FI hardwire pin, the second FI hardwire flag used to indicate the second fault.

In a possible implementation, the controller is further configured to clear the second FI hardwire flag and/or the second fault information based on a second instruction from the second processor in the control apparatus.

Further, optionally, the controller may be configured to receive the second instruction from the second processor in the control apparatus by using the fourth interface circuit corresponding to the first channel.

In a possible implementation, the controller is further configured to send a first FI hardwire flag to a first processor in the control apparatus by using a first FI hardwire pin, where the first FI hardwire flag is used to indicate that the first fault is generated.

Further, optionally, the controller is configured to: when detecting the first fault, send, to the first processor in the control apparatus by using the first FI hardwire pin, the first FI hardwire flag used to indicate that the first fault is generated.

In a possible implementation, the controller is configured to obtain the first fault information in a fault register based on a first request message from the first processor in the control apparatus.

Further, optionally, the controller may be configured to receive the first request message from the first processor in the control apparatus by using the fourth interface circuit corresponding to the first channel.

According to a fifth aspect, this application provides a signal processing device. The signal processing device includes the control apparatus in the third aspect or any possible implementation of the third aspect and/or the electromagnetic signal transceiver apparatus in the fourth aspect or any possible implementation of the fourth aspect. The control apparatus may be configured to perform any method in the first aspect or the first aspect, and the electromagnetic signal transceiver apparatus may be configured to perform any method in the second aspect or the second aspect.

According to a sixth aspect, this application provides a terminal device. The terminal device may include the signal processing device in the fifth aspect.

In a possible implementation, the terminal device may be an intelligent transportation device (a vehicle or an unmanned aerial vehicle), a smart home device, an intelligent manufacturing device, a robot, or the like.

The intelligent transportation device may be, for example, an automated guided vehicle (automated guided vehicle, AGV) or an unmanned transportation vehicle.

According to a seventh aspect, this application provides a computer-readable storage medium. The computer-readable storage medium stores a computer program or instructions. When the computer program or the instructions are executed by a control apparatus, the control apparatus is enabled to perform the method in the first aspect or any possible implementation of the first aspect. Alternatively, when the computer program or the instructions are executed by an electromagnetic signal transceiver apparatus, the electromagnetic signal transceiver apparatus is enabled to perform the method in the second aspect or any possible implementation of the second aspect.

According to an eighth aspect, this application provides a computer program product. The computer program product includes a computer program or instructions. When the computer program or the instructions are executed by a control apparatus, the control apparatus is enabled to perform the method in the first aspect or any possible implementation of the first aspect. Alternatively, when the computer program or the instructions are executed by an electromagnetic signal transceiver apparatus, the electromagnetic signal transceiver apparatus is enabled to perform the method in the second aspect or any possible implementation of the second aspect.

For technical effects that can be achieved in the third aspect, refer to descriptions of beneficial effects in the first aspect. For technical effects that can be achieved in the fourth aspect, refer to descriptions of beneficial effects in the second aspect. For technical effects that can be achieved in the fifth aspect to the eighth aspect, refer to descriptions of beneficial effects in the first aspect and the second aspect. Details are not described herein again.

BRIEF DESCRIPTION OF DRAWINGS

FIG. 1A and FIG. 1B are a schematic flowchart of an information transmission method in the conventional technology;

DESCRIPTION OF EMBODIMENTS

Figure 1A:
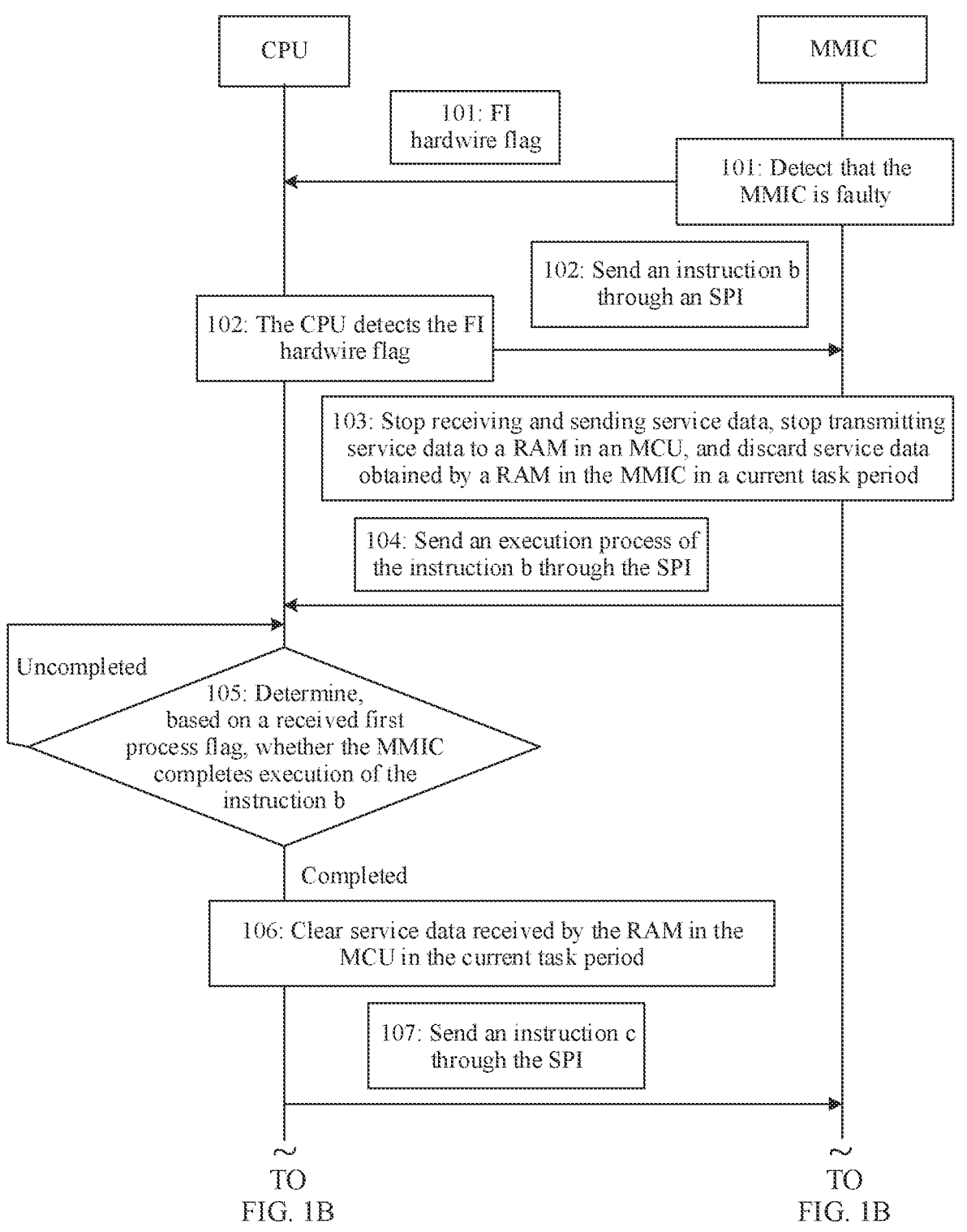

The following describes in detail embodiments of this application with reference to the accompanying drawings.

The following describes some terms in this application. It should be noted that these explanations are intended to facilitate understanding by a person skilled in the art, but do not constitute a limitation on the protection scope claimed in this application.

I. Rising Edge and Falling Edge

The rising edge means that in a digital circuit, a level of a voltage is represented by a logical level. The logical level includes two types: a high level and a low level. For digital circuits including different elements, voltages also correspond to different logical levels. It may be stipulated that a logical high level is represented by a digit 1 and a logical low level is represented by a digit 0. A moment at which a digital level changes from a low level (the digit "0") to a high level (the digit "1") is referred to as the rising edge, and a moment at which the digital level changes from the high level (digit "1") to the low level (digit "0") is referred to as the falling edge.

II. Random Access Memory (Random Access Memory, RAM)

The random access memory is also referred to as a main memory, which is an internal memory that directly exchanges data with a CPU. The random access memory may be read and written at any time (except during refreshing) and has a high speed, and is usually used as a temporary data storage medium for an operating system or another running program. During working, information may be written (stored) into any specified address in the RAM at any time or information may be read (obtained) from any specified address in the RAM at any time. After the RAM is powered on, data information can be accessed at any location at any time. After the RAM is powered off, internal information disappears accordingly.

III. Register

Registers are some small storage areas used to store data in a CPU, and are used to temporarily store data participating in calculation and a calculation result. This may also be understood as that the register is usually a sequential logic circuit, but the sequential logic circuit includes only a storage circuit. The storage circuit of the register includes a latch or a flip-flop. Because one latch or flip-flop can store a 1-bit binary number, N latches or flip-flops may form an N-bit register. The register is a component of a central processing unit. Registers are high-speed storage components with a limited storage capacity, and can be used to temporarily store instructions, data, and addresses. Triggers in the registers are only required to have a function of setting 1 and setting 0. Therefore, both a level-triggered trigger and a pulse-triggered or edge-triggered trigger can form the register.

IV. Serial Peripheral Interface (Serial Peripheral Interface, SPI)

The serial peripheral interface is a synchronous peripheral interface, which enables a single-chip microcomputer (or a monolithic microwave integrated circuit) to communicate with various peripheral devices in a serial manner to exchange information. The peripheral devices include but are not limited to a microprocessing unit (microcontroller unit, MCU) and the like.

The SPI may be applied to various systems under control of software, for example, a multi-host system (distributed system) formed by connecting one primary controller and several secondary controllers or connecting several secondary controllers, or various systems including one primary controller and one or several secondary I/O devices. In some application scenarios, a primary controller may be used as a primary control machine to control data and transmit the data to one or several peripheral devices. A secondary controller can receive or send data only when the primary controller sends a command. A data transmission format of the secondary controller is that a most significant bit (MSB) is located before a least significant bit (LSB).

V. Hardwire Pin

The hardwire pin means that two pins are connected by using a hardwire, to transmit a high level and a low level.

FIG. 1A and FIG. 1B are a schematic flowchart of an information processing method in the conventional technology. In the method, a CPU is a CPU in an MCU, and a control unit is a control unit included in an MMIC. The method includes the following steps.

Step 101: The control unit in the MMIC detects that the MMIC is faulty, and sends an FI hardwire flag to the MCU.

Herein, the control unit detects that the MMIC is faulty and triggers the FI hardwire flag.

Step 102: The CPU detects the FI hardwire flag, and sends an instruction b to the control unit through an SPI, where the instruction b is used to instruct the MMIC to stop receiving and sending service data (that is, stop collecting normal service data of a millimeter-wave radar system), and discard service data obtained in a current task periodicity.

Step 103: The control unit in the MMIC stops, based on the instruction b, receiving and sending service data, stops transmitting service data to a RAM in the MCU, and discards (clears) service data obtained by a RAM in the MMIC in the current task periodicity.

Step 104: The control unit in the MMIC periodically sends an execution process of the instruction b to the CPU through the SPI. Correspondingly, the CPU receives the execution process of the instruction b from the control unit. Herein, a first process flag may be used to indicate the execution process of the instruction b, and the first process flag may be identified by 0 and 1, where 0 indicates that execution of the instruction b is uncompleted, and 1 indicates that execution of the instruction b is completed.

Step 105: The CPU may determine, based on the first process flag, whether the MMIC completes execution of the instruction b; and if the MMIC completes execution of the instruction b, perform step 106; or if the MMIC does not complete execution of the instruction b, continue to detect the execution process of the instruction b, that is, repeat step 105. Herein, when the first process flag received by the CPU is 0, it may be determined that execution of the instruction b is uncompleted; or when the first process flag received by the CPU is 1, it may be determined that execution of the instruction b is completed.

Step 106: The CPU clears (or referred to as "discards") service data received by the RAM in the MCU in the current task periodicity.

Herein, clearing the service data received by the RAM in the MCU in the current task periodicity means clearing all data stored in the RAM in the MCU.

Step 107: The CPU sends an instruction c to the control unit through the SPI.

Correspondingly, the control unit receives the instruction c from the CPU through the SPI, where the instruction c is used to instruct the control unit to query a fault register.

Step 108: The control unit in the MMIC queries the fault register based on the instruction c, to obtain information in the fault register.

Step 109: The control unit in the MMIC sends the found information in the fault register to the CPU through the SPI. Correspondingly, the CPU may receive the information in the fault register from the control unit through the SPI.

Step 110: The CPU identifies a first fault based on the information in the fault register. For example, if the information in the fault register that is received by the CPU is 0100000000000000000000000000000000, the CPU may identify that a fault occurs in the second bit.

Step 111: The CPU processes the identified first fault.

After the CPU completes processing of the first fault through step 111, an FI hardwire flag corresponding to the first fault and fault information corresponding to the first fault need to be cleared.

Step 112: The CPU sends an instruction d to the control unit through the SPI.

Correspondingly, the control unit receives the instruction d from the CPU through the SPI, where the instruction d is used to instruct the control unit to clear the FI hardwire flag bit and the fault information corresponding to the first fault.

Step 113: Based on the instruction d, the control unit in the MMIC clears the fault information corresponding to the first fault and clears the FI hardwire flag.

Step 114: The control unit in the MMIC periodically sends a response d to the CPU through the SPI. Correspondingly, the CPU receives the response d from the control unit. Herein, the response d includes an execution process of the instruction d, where 0 indicates that execution of the instruction d is uncompleted, and 1 indicates that execution of the instruction d is completed.

Step 115: The CPU determines, based on the received response d, that the MMIC completes execution of the instruction d, and exits a fault processing task.

Figure 2:
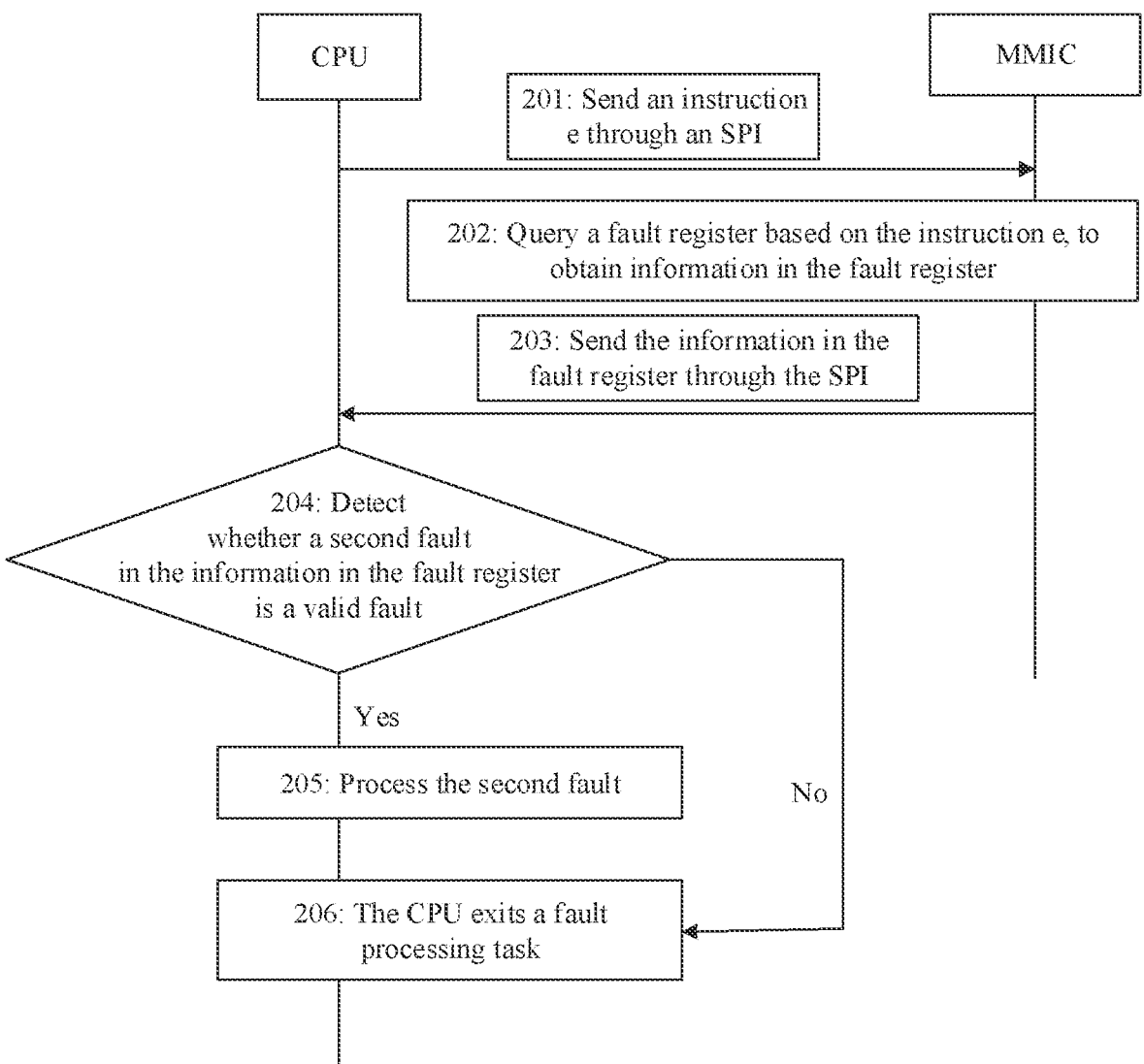
FIG. 2 is a schematic flowchart of another information transmission method in the conventional technology.

Based on FIG. 1A and FIG. 1B, a single-point fault can be processed. To process a dual-point fault, in the conventional technology, after completing processing of the first fault, the CPU actively queries whether a second fault is generated and processes the second fault. FIG. 2 shows an information processing method in the conventional technology. The information processing method may be used to resolve a dual-point fault.

In the conventional technology, during processing of a dual-point fault, the $1^{st}$ fault (referred to as a first fault) generated in an MMIC is first processed. For a specific processing process, refer to step 101 to step 114 in FIG. 1A and FIG. 1B. After step 115 in which the CPU determines that the MMIC completes execution of the instruction d, the following step 201 to step 207 are performed.

Step 201: The CPU sends an instruction e to the control unit through an SPI. Correspondingly, the control unit receives the instruction e from the SPI through the SPI, where the instruction e is used to instruct the control unit to query fault information.

Step 202: The control unit in the MMIC may query a fault register based on the instruction e, to obtain information in the fault register. Herein, the information in the fault register that is found by the control unit includes fault information of two faults. For example, if the found information in the fault register is 0100100000000000000000000000000000, it indicates that a fault occurs in the second bit and a fault occurs in the fifth bit.

Step 203: The control unit in the MMIC sends the found information in the fault register to the CPU through the SPI. Correspondingly, the CPU may receive the information in the fault register from the control unit through the SPI. For step 203, refer to the description of step 109. Details are not described herein again.

Step 204: The CPU detects whether a second fault in the information in the fault register is a valid fault; and performs step 205 if the second fault in the information in the fault register is a valid fault; or performs step 206 if the second fault in the information in the fault register is not a valid fault.

Because the CPU actively periodically queries whether there is a fault, the MMIC may not be faulty during query by the CPU. Therefore, whether the second fault is a valid fault needs to be determined. Herein, the CPU needs to identify the second fault from the information in the fault register. For example, if the found information in the fault register is 01000000000000000000000000000000, and it can be determined that the fault in the second bit has been processed, it indicates that the second fault does not occur or is an invalid fault. Alternatively, if the found information in the fault register is 01001000000000000000000000000000, and it can be determined that the fault in the second bit has been processed, it indicates that the fault in the fifth bit is a valid fault, that is, the second fault.

Step 205: The CPU may process the second fault.

Step 206: The CPU exits a fault processing task.

Based on the existing information processing method, after generating a fault, an MMIC triggers an FI hardwire flag bit, and sends the FI hardwire flag to a CPU in an MCU. After detecting the FI hardwire flag, the CPU sends, to the MMIC, an instruction of querying a fault register. The MMIC sends found information in the fault register to the CPU. The CPU identifies the information in the fault register, and processes the $1^{st}$ fault after identifying the $1^{st}$ fault. The FI hardwire flag is cleared only after the $1^{st}$ fault is processed. Based on this, if the MMIC generates a new fault in a task periodicity in which the $1^{st}$ fault is processed, and the FI hardwire flag of the $1^{st}$ fault is not cleared, the CPU cannot learn of the new fault and does not process the new fault. As a result, the new fault cannot be processed in time, which causes a short circuit of a system, occurrence of incorrect data, or the like.

Figure 4:
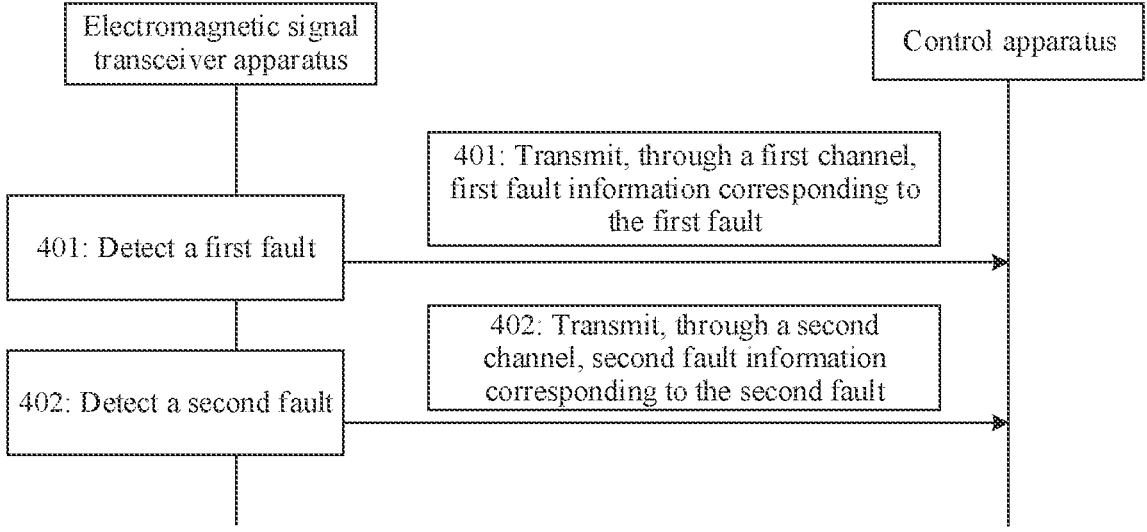
FIG. 4 is a schematic flowchart of an information transmission method according to this application.

In view of the foregoing problem, this application provides an information transmission method. Refer to FIG. 4 below. The information transmission method enables each fault in a dual-point fault to be processed in time as much as possible.

The following describes a system architecture to which the information transmission method provided in this application may be applied.

Figure 3:
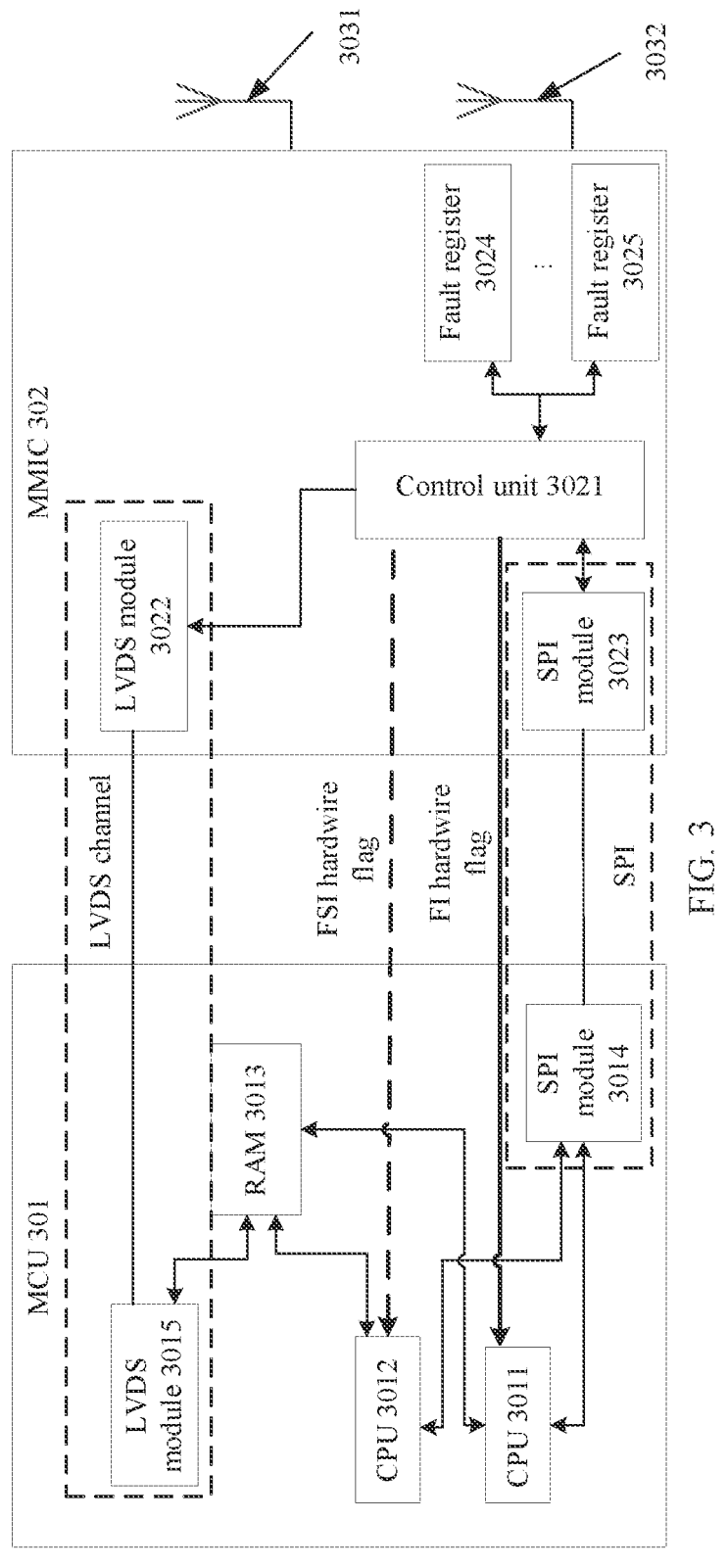
FIG. 3 is a schematic diagram of a millimeter-wave radar system according to this application.

FIG. 3 is a schematic diagram of a possible architecture of a millimeter-wave radar system according to this application. As shown in FIG. 3, the millimeter-wave radar system may include a microcontroller unit (microcontroller unit, MCU) 301 and a monolithic microwave integrated circuit (monolithic microwave integrated circuit, MMIC) 302. The MCU 301 may include at least two central processing units (central processing unit, CPU) (an example in which a CPU 3011 and a CPU 3012 are included is used in FIG. 3), a RAM 3013, an SPI module 3014, and an LVDS module 3015. The MMIC 302 may include a control unit (control unit) 3021, an LVDS module 3022, an SPI module 3023, a fault register 3024, a fault register 3025, and the like. The SPI module 3014 corresponds to the SPI module 3023. The SPI module 3014, the SPI module 3023, and a physical connection line (for example, a cable or a PCB wire) between the SPI module 3014 and the SPI module 3023 may form a channel between the MCU 301 and the MMIC 302, for example, the channel is referred to as an SPI. The LVDS module 3015 corresponds to the LVDS module 3022. The LVDS module 3015, the LVDS module 3022, and a physical connection line (for example, a cable or a PCB wire) between the LVDS module 3015 and the LVDS module 3022 may also form a channel between the MCU 301 and the MMIC 302, for example, the channel may be referred to as an LVDS channel. The LVDS module 3015 may be referred to as a differential signaling transmitter, and may be configured to convert a TTL signal in unbalanced transmission into an LVDS signal in balanced transmission. The LVDS module 3022 may be referred to as a differential signaling receiver, and may be configured to convert an LVDS signal in balanced transmission into a TTL signal in unbalanced transmission. It should be understood that the SPI module may be an interface circuit or referred to as an input/output interface, and the LVDS module may be an interface circuit or referred to as an input/output interface. The CPU 3011 (or the CPU 3012) may communicate with the control unit 3021 through the SPI, and the RAM 3013 may communicate with the control unit 3021 through the LVDS channel. For example, an electromagnetic wave or the like received by the MMIC 302 may be transmitted to the RAM 3013 through the LVDS channel. The MCU may further include a plurality of pins, and a function of each pin may be controlled by software to implement a specific function. For example, an interrupt pin in the MCU can implement an interrupt function through software control. It should be noted that the MMIC 302 is a passive component, and needs to be controlled by the MCU 301 to execute a task. It should be noted herein that various elements included in the architecture are merely examples for description. For example, the CPU, the fault register, and the like all may be replaced with other elements with equivalent functions. A specific element type is not specifically limited in this application.

The control unit 3021 is configured to control working of the MMIC 302, for example, may control the MMIC 302 to detect service data, detect a fault in the MMIC, and so on. The control unit 3021 may generate a radar signal (that is, an electromagnetic wave), and send the radar signal by using a transmitter. The radar signal includes one or more burst (burst) packets, and each burst includes a plurality of chirp signals. After the radar signal is sent, an echo signal is formed after the radar signal is reflected by one or more targets, and the echo signal is received by a receiver. The MMIC 302 is further configured to perform processing such as conversion and sampling on the echo signal received by the receiver, and transmit a processed echo signal to the MCU 301.

Both the CPU 3011 and the CPU 3012 are configured to process a fault, for example, process a fault generated by the MMIC 302.

The RAM 3013 is configured to temporarily store data (for example, an electromagnetic wave), fault information, and/or transmitted from the MMIC 302.

Further, optionally, the millimeter-wave radar system may further include a transmitter 1031, a receiver 1032, and the like. The transmitter may include a transmit antenna and a transmit channel in the MMIC, and the receiver may include a receive antenna and a receive channel in the MMIC. The transmit antenna and the receive antenna may be located on a printed circuit board (printed circuit board, PCB), and the transmit channel and the receive channel may be located in a chip, that is, AOB (antenna on PCB). Alternatively, the transmit antenna and the receive antenna may be located in a chip package, and the transmit channel and the receive channel may be located in a chip, that is, AIP (antenna in package). A combination form is not specifically limited in this embodiment of this application.

The millimeter-wave radar system shown in FIG. 3 may be applied to a plurality of fields, for example, a vehicle-mounted radar (that is, the millimeter-wave radar system is mounted on a vehicle), a roadside traffic radar (that is, the millimeter-wave radar system is mounted on a roadside traffic device), and an unmanned aerial vehicle radar (that is, the millimeter-wave radar system is mounted on an unmanned aerial vehicle). Alternatively, the millimeter-wave radar system shown in FIG. 3 may be applied to a terminal device or disposed in a component of the terminal device. The terminal device may be, for example, a smart home device, an intelligent manufacturing device, a robot, or an intelligent transportation device. The intelligent transportation device may be, for example, an automated guided vehicle (automated guided vehicle, AGV) or an unmanned transportation vehicle.

When the millimeter-wave radar system is applied to a vehicle, that is, a vehicle-mounted millimeter-wave radar, the millimeter-wave radar system may further include a connector (connector), a control area network (controller area network, CAN), electromagnetic compatibility (electromagnetic compatibility, EMC) protection, and a power management module (power management ICs, PMIC). The connector may be configured to connect the millimeter-wave radar system to an electrical and electronic system in the entire vehicle. The control area network can be used for information exchange between electrical and electronic systems in the entire vehicle. For example, fault information can be reported to the electrical and electronic systems in the entire vehicle by using the CAN. The control area network is a serial communication protocol in an ISO international standard, and can be configured to directly communicate with an external control end. Electromagnetic compatibility protection can be used for electromagnetic compatibility protection of a power supply. The power management module may be configured to convert power that is input into the entire vehicle into 3.3 V and 1.25 V, and supply the power to the CAN, the MCU, the MMIC, and the like.

The vehicle-mounted millimeter-wave radar system can measure a distance, an angle, and a relative speed between the millimeter-wave radar system and a measured object. Specifically, the vehicle-mounted millimeter-wave radar system may transmit a millimeter wave by using the transmitter 1031 and receive a target reflected signal by using the receiver 1032, and after processing the target reflected signal, may quickly and accurately obtain physical environment information around a vehicle body of the vehicle (for example, a relative distance, a relative speed, an angle, and a moving direction between the vehicle and another object), and then perform target tracking, identification, and classification based on the detected object information, to perform data fusion in combination with dynamic information of the vehicle body. After making a proper decision, the vehicle-mounted millimeter-wave radar system may notify or warn a driver in a plurality of manners, such as sound, light, and a tactile manner, or perform active intervention for the vehicle in time, to ensure safety and comfort in a driving process and reduce a probability of occurrence of an accident. Currently, the vehicle can use the millimeter-wave radar system to implement functions of an advanced driver assistant system (advanced driving assistant system, ADAS), such as adaptive cruise control (adaptive cruise control), forward collision warning (forward collision warning), blind spot detection (blind spot detection), parking aid (parking aid), and lane change assist (lane change assistant).

It should be noted that the system architecture and the applicable scenario described in this application are intended to describe the technical solutions in this application more clearly, and do not constitute a limitation on the technical solutions provided in this application. A person of ordinary skill in the art may know that, with evolution of the system architecture and emergence of a new service scenario, the technical solutions provided in this application are also applicable to the following similar technical problems.

Transmission and processing of information about the electrical and electronic system in the millimeter-wave radar system is indispensable, especially transmission and processing of fault information of the electrical and electronic system. Fault behavior of the electrical and electronic system is mainly caused by a random hardware failure and a system failure. Random hardware failures are further classified into a single-point failure, a dual-point failure (or referred to as a dual-point fault), and a multi-point failure (also referred to as a security failure) including a three-point failure. The single-point failure means one fault occurred in a same task periodicity, and the task periodicity means duration from occurrence of a fault to completion of processing of the fault. The dual-point failure means two faults occurred in a same task periodicity, and the three-point failure means three faults occurred in a same task periodicity. A probability that the multi-point failure occurs is very low, and therefore the failure basically can be ignored.

To ensure function safety of components in the millimeter-wave radar system, a fault generated by the electrical and electronic system needs to be processed in time. FIG. 4 shows an information transmission method according to this application. The method may be applied to the millimeter-wave radar system shown in FIG. 3 or a related apparatus in the millimeter-wave radar system. For example, the method may be applied to an electromagnetic signal transceiver apparatus and a control apparatus. The control apparatus includes a first processor and a second processor, and optionally, may further include at least one memory. The electromagnetic signal transceiver apparatus includes a controller, and optionally, may further include at least one register. The method includes the following steps.

Step 401: The electromagnetic signal transceiver apparatus detects a first fault, and may transmit, to the control apparatus through a first channel, first fault information corresponding to the first fault. Correspondingly, the control apparatus obtains the first fault information of the electromagnetic signal transceiver apparatus through the first channel.

In a further optional design of step 401, the first fault information is transmitted to the first processor in the control apparatus through the first channel, and/or the first processor in the control apparatus obtains the first fault information through the first channel.

In a possible implementation, the first channel may be a control channel, for example, an SPI, an inter-integrated circuit (inter-integrated circuit, IIC) interface, or a serial communication interface (serial communication interface, SCI); or a channel corresponding to the interface may be referred to as the channel. Optionally, the control apparatus is a microcontroller unit, for example, the MCU 301, and the electromagnetic signal transceiver apparatus is a monolithic microwave integrated circuit, for example, the MMIC 302.

In a possible implementation, when detecting the first fault, the electromagnetic signal transceiver apparatus may send, to the first processor in the control apparatus, a first FI hardwire flag used to indicate that the first fault is generated. For example, when detecting the first fault, the electromagnetic signal transceiver apparatus may set an FI hardwire flag to a high level (for example, 1), and send the FI hardwire flag set to the high level to the control apparatus, where the FI hardwire flag set to the high level is the first FI hardwire flag. Optionally, the FI hardwire flag is represented by 1 after being triggered. It should be understood that the FI hardwire flag may also be a rising edge or a falling edge.

Correspondingly, the first processor in the control apparatus receives the first FI hardwire flag from the electromagnetic signal transceiver apparatus. Further, the first processor sends a first request message to the electromagnetic signal transceiver apparatus, where the first request message is used to request the first fault information. In a possible implementation, the electromagnetic signal transceiver apparatus may obtain the first fault information in a fault register based on the first request message. Specifically, the electromagnetic signal transceiver apparatus may query fault registers based on the first request message in a sequence of the fault registers, to obtain information in the fault registers, where the information in the fault register includes the first fault information. The information in the fault register may have 32 bits or 64 bits, and the following uses an example in which the information in the fault register has 32 bits. If no fault occurs, the information in the fault register is 00000000000000000000000000000000. If one fault occurs, 1 bit in the 32 bits changes from 0 to 1, for example, 00000100000000000000000000000000. If two faults occur, 2 bits in the 32 bits change from 0 to 1, for example, 00100100000000000000000000000000. In other words, 1 indicates that a fault occurs, and 0 indicates that no fault occurs.

Further, the electromagnetic signal transceiver apparatus may send the information in the fault register to the control apparatus, where the information in the fault register includes the first fault information. Correspondingly, the control apparatus may receive the information in the fault register from the electromagnetic signal transceiver apparatus. Further, optionally, the first processor in the control apparatus may identify the first fault information in the information in the fault register. For example, if the information in the fault register that is received by the first processor is 00000100000000000000000000 00000, the first processor may identify that the sixth bit is the first fault information, that is, the first fault information is in the sixth bit. For another example, if the information in the fault register that is received by the first processor is 00100100000000000000000000000000, the first processor performs identification in sequence, and identifies that the third bit is the first fault information, that is, the first fault information is in the third bit.

Step 402: The electromagnetic signal transceiver apparatus detects a second fault, and may transmit, to the control apparatus through a second channel, second fault information corresponding to the second fault. Correspondingly, the control apparatus obtains the second fault information through the second channel.

In a further optional design of step 402, the second fault information is transmitted to the second processor in the control apparatus through the second channel, and/or the second processor in the control apparatus obtains the second fault information transmitted through the second channel.

Herein, the second channel may be a data channel, for example, an LVDS channel or a mobile industry processor interface (mobile industry processor interface, MIPI).

In an optional design, the first channel is an SPI, and the second channel is an LVDS channel. In this way, when being applied to a millimeter-wave radar, the solution can be compatible with the SPI and the LVDS channel in the existing millimeter-wave radar.

In a possible implementation, the second fault information may be stored in a first memory in the control apparatus. In other words, the electromagnetic signal transceiver apparatus transmits the second fault information to the first memory in the control apparatus through the second channel.

The following shows two example possible implementations of obtaining the second fault information by the second processor.

Implementation 1: The second processor detects a second FI hardwire flag, where the second FI hardwire flag is used to indicate that the second fault occurs on the electromagnetic signal transceiver apparatus. The second processor obtains the second fault information from the first memory.

Implementation 2: The second processor periodically queries the first memory, and obtains the second fault information from the first memory. For example, the second processor may periodically query the first memory, and identify the second fault information. For a possible identification manner, refer to related description of step 509 in FIG. 5. In this case, no FI hardwire flag needs to be triggered.

Based on Implementation 1 or Implementation 2, when detecting the second fault, the electromagnetic signal transceiver apparatus may send the information in the fault register to the control apparatus through the LVDS channel. Correspondingly, the control apparatus may receive the information in the fault register from the electromagnetic signal transceiver apparatus through the LVDS channel. Further, the second processor in the control apparatus may obtain (or referred to as "identify") the information in the fault register, and identify the second fault information from the information in the fault register.

For example, the information in the fault register that is obtained by the second processor from the first memory in the control apparatus is 00100100000000000000000000000000, and the second processor reads, from a cache of the first processor, that the sixth bit (that is, the first fault information) in the information in the fault register has been processed by the first processor. When identifying the information 00100100000000000000000000000000 in the fault register, the second processor shields the sixth bit, that is, skip identifying the first fault information in the sixth bit. The second processor identifies the third bit and determines the third bit as the second fault information.

For another example, the information in the fault register that is read by the second processor from the first memory in the control apparatus is 00000100010000000000000000000000, and the second processor reads, from the cache of the first processor, that a fault (that is, the first fault information) in the sixth bit of the information in the fault register has been processed by the first processor. When identifying the information 00000100010000000000000000000000 in the fault register, the second processor shields the sixth bit, that is, skip identifying the fault information in the sixth bit. The second processor continues to identify bits after the sixth bit until identifying the tenth bit, and determines the tenth bit as the second fault information.

It can be learned from step 401 and step 402 that, the second processor may process the second fault simultaneously when the first processor processes the first fault, so that each fault in a dual-point fault can be processed in time as much as possible. In addition, the first fault information and the second fault information are sent through two channels, which helps avoid a case in which a communication channel fails because a single channel is used.

After obtaining the second fault information, the control apparatus may process the second fault corresponding to the second fault information. The following shows three example possible manners of triggering the second processor to process the second fault.

Manner 1: The second processor receives a first instruction from the first processor.

In a possible implementation, when detecting the first FI hardwire flag, the first processor may further send the first instruction to the second processor, where the first instruction is used to instruct the second processor to process the second fault. Correspondingly, the second processor may receive the first instruction from the first processor, and process the second fault in response to the first instruction.

It should be understood that if the first processor in the control apparatus detects the FI hardwire flag, it indicates that a fault (referred to as the first fault) has occurred in the electromagnetic signal transceiver apparatus. In this case, the first processor needs to process the first fault. To avoid that a new fault generated by the electromagnetic signal transceiver apparatus in a task periodicity in which the first processor processes the first fault cannot be processed in time, the second processor needs to start a fault processing interrupt task to process, in time, the new fault (referred to as the second fault) generated by the electromagnetic signal transceiver apparatus. Based on this, the first instruction may be used to instruct the second processor to process the second fault. Specifically, the first instruction may directly instruct the second processor to process the second fault; or the first instruction indirectly instructs the second processor to process the second fault. For example, the first instruction indicates that the first processor is occupied to process the first fault, or instructs the second processor to start a fault processing task, so that when the second fault is generated, the second processor can process the second fault.

In a possible implementation, the first instruction may trigger a software flag bit in the second processor, and the second processor reads, in a storage area corresponding to the software flag bit, a fault processing task corresponding to the software flag bit.

Manner 2: The second processor detects a second FI hardwire flag.

Based on Manner 2, the second processor may process the second fault in response to detection of the second FI hardwire flag. It should be understood that if the second processor detects the second FI hardwire flag, it indicates that the second fault has occurred, and the second processor may be triggered herein to process the second fault.

Manner 3: The second processor determines that processing of the first fault is uncompleted.

Based on Manner 3, the second processor may process the second fault in response to uncompleted processing of the first fault. It should be understood that the first processor does not complete processing of the first fault. In this case, the first processor needs to process the first fault. To avoid that a new fault generated by the electromagnetic signal transceiver apparatus in a task periodicity in which the first processor processes the first fault cannot be processed in time, the second processor needs to start a fault processing task.

It should be noted that any combination of the foregoing three manners may alternatively trigger the second processor to process the second fault. For example, when the second processor determines that processing of the first fault is uncompleted and detects the second FI hardwire flag (that is, a combination of Manner 2 and Manner 3), the second processor processes the second fault in response to uncompleted processing of the first fault and detection of the second FI hardwire flag. It should be understood that if the second processor detects the second FI hardwire flag, it indicates that the second fault has occurred. In addition, the first processor does not complete processing of the first fault. To enable the first fault and the second fault to be processed in time as much as possible, the second processor needs to process the second fault.

The following description is provided by using an example in which the first FI hardwire flag is an FI hardwire flag, the second FI hardwire flag is a second fault indication (fault second indication, FSI) hardwire flag, the first memory is a RAM in an MCU, the electromagnetic signal transceiver apparatus is an MMIC, the control apparatus is the MCU, the first processor is a first CPU, the second processor is a second CPU, the first channel is an SPI, and the second channel is an LVDS channel. In other words, in subsequent description of this application, each RAM may be replaced with the first memory, each MMIC may be replaced with the electromagnetic signal transceiver apparatus, each MCU may be replaced with the control apparatus, each first CPU may be replaced with the first processor, each second CPU may be replaced with the second processor, each FI hardwire flag may be replaced with the first FI hardwire flag, each FSI hardwire flag may be replaced with the second FI hardwire flag, each SPI may be replaced with the first channel, and each LVDS channel may be replaced with the second channel. The following is merely an example description for ease of description.

Figure 5:
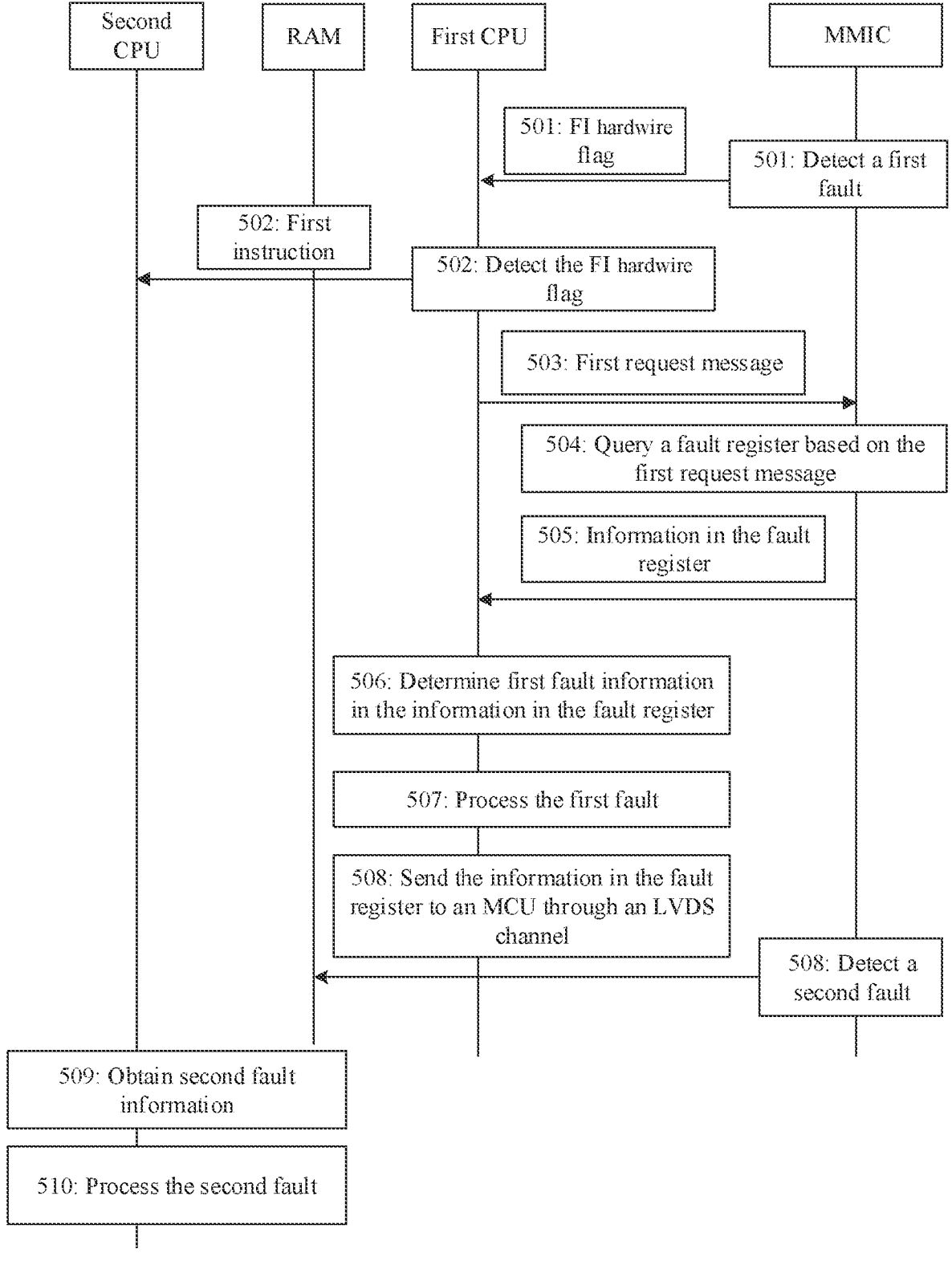
FIG. 5 is a schematic flowchart of another information transmission method according to this application.

FIG. 5 shows another information transmission method according to this application. The information transmission method may be applied to the millimeter-wave radar system shown in FIG. 3. The method may include the following steps.

Step 501: An MMIC detects a first fault, and sends an FI hardwire flag to a first CPU.

With reference to FIG. 3, the control unit 3021 in the MMIC 302 may detect the first fault, and send an FI hardwire flag to the CPU 3011 by using an FI hardwire pin connected to a pin of the MCU 301.

It should be understood that the MMIC may start to detect a fault based on an instruction a sent by the first CPU.

Step 502: The first CPU in an MCU detects the FI hardwire flag, and sends a first instruction to a second CPU in the MCU. Correspondingly, the second CPU receives the first instruction from the first CPU.

Herein, each pin of the MCU has a corresponding flag, and the flag corresponding to the pin may be stored in a register of the MCU. A pin of the MCU is connected to an FI hardwire pin, and the register stores a flag bit (referred to as an FI hardwire flag bit) of the pin connected to the FI hardwire pin. The first CPU may periodically detect the FI hardwire flag bit in the register of the MCU, to determine whether the MMIC is faulty. For example, if the CPU detects that the FI hardwire flag is 1, it indicates that a fault occurs in the MMIC. For description of the first instruction, refer to the foregoing related content. Details are not described herein again.

Step 503: The first CPU in the MCU sends a first request message to the MMIC. Correspondingly, the MMIC receives the first request message from the first CPU in the MCU.

The first request message is used to request first fault information, or the first request message is used to request the MMIC to query a fault register, to obtain the first fault information.

Step 504: The MMIC queries the fault register based on the first request message.

Herein, the MMIC may query information in the fault register based on the first request message. It should be noted that the MMIC is a passive component, and can only determine that a fault occurs, but cannot identify a specific faulty bit in the fault register.

Step 505: The MMIC may send the information in the fault register to the first CPU. Correspondingly, the first CPU may receive the information in the fault register from the MMIC and buffer the information.

Herein, the information in the fault register includes the first fault information.

In a possible implementation, the MMIC may send the information in the fault register to the first CPU through an SPI. Correspondingly, the first CPU may receive the information in the fault register from the MMIC through the SPI and buffer the information.

When a data amount of the found information in the fault register is relatively large, the MMIC may need to send the information in the fault register to the first CPU a plurality of times. For the information in the fault register, refer to the foregoing related description. Details are not described herein again.

Step 506: The first CPU in the MCU determines (or referred to as "identifies") the first fault information in the information in the fault register.

Herein, for a process in which the first CPU identifies the first fault information in the information in the fault register, refer to the foregoing related description. Details are not described herein again. It should be noted that after identifying the first fault information, the first CPU does not continue to identify a subsequent bit, and may perform the following step 507.

Step 507: The first CPU in the MCU processes the first fault.

In a possible implementation, fault processing software deployed in the first CPU includes a fault processing policy, and the fault processing policy includes but is not limited to a correspondence between a fault level and a processing method. For example, if the fault level is a minor fault, the MMIC is reset; if the fault cannot be recovered for three times, the MMIC is powered off, or if the fault level is a critical fault, the MMIC is directly powered off. For example, the first CPU may first determine a level of the first fault, and perform corresponding processing on the first fault based on the level of the first fault.

Step 508: The MMIC detects a second fault, and may send the information in the fault register to the MCU through an LVDS channel. Correspondingly, the MCU may receive the information in the fault register from the MMIC through the LVDS channel.

Herein, the information in the fault register may be stored in a RAM of the MCU, and the information in the fault register includes second fault information.

With reference to FIG. 3, when detecting the second fault, the MMIC 302 may send the information in the fault register to the RAM 3013 in the MCU 301 through the LVDS channel. Correspondingly, the RAM 3013 in the MCU 301 stores the information in the fault register. In other words, when the MMIC 302 detects the second fault, the LVDS channel is no longer used to transmit normal service data to the RAM 3013 in the MCU 301, and instead, the LVDS channel is multiplexed to transmit the information in the fault register to the RAM 3013 in the MCU 301.

Herein, when detecting the second fault, the MMIC can only determine that two faults occur, and cannot determine two specific bits that are faulty in the fault register. For example, the information in the fault register is 0010010000000000000000000000000, and the MMIC sends the information 0010010000000000000000000000000 in the fault register to the RAM in the MCU through the LVDS channel. Correspondingly, the RAM in the MCU may store 0010010000000000000000000000000. For another example, the information in the fault register is 0000010001000000000000000000000, and the MMIC sends the information 0000010001000000000000000000000 in the fault register to the RAM in the MCU through the LVDS channel. Correspondingly, the RAM in the MCU may store 0000010001000000000000000000000.

In a possible implementation, after detecting the $1^{st}$ fault, the MMIC keeps continuing to detect a fault, and the $2^{nd}$ fault may be detected at any time in a task periodicity of the $1^{st}$ fault after the $1^{st}$ fault is detected.

It should be noted that step 508 may be any step after step 501 and before step 509.

Step 509: The second CPU in the MCU obtains (or referred to as "identifies") the second fault information in the information in the fault register.

The following shows two example possible implementations in which the second CPU in the MCU obtains the second fault information in the information in the fault register.

Implementation 1: The second CPU detects an FSI hardwire flag, and obtains the second fault information from a RAM in the MCU.

With reference to FIG. 3, the CPU 3011 is connected to the control unit 3021 by using an FI hardwire pin, and the CPU 3012 is connected to the control unit 3021 by using an FSI hardwire pin. In other words, an FSI hardwire flag used for fault indication is set between the MMIC 302 and the MCU 301. The control unit 3021 in the MMIC 302 detects the second fault, and sends an FSI hardwire flag to the CPU 3012 by using an FSI hardwire pin connected to a pin of the MCU 301. For example, two hardwire flag bits (that is, an FI hardwire flag bit and an FSI hardwire flag bit) are preconfigured in firmware deployed in the MMIC, and a function of an FSI hardwire pin and a function of an FI hardwire pin are controlled by using software. That is, when the firmware deployed by the MMIC detects a fault for the first time, the FI hardwire flag bit is triggered; and when the firmware detects a fault for the second time, the FSI hardwire flag bit is triggered.

Based on Implementation 1, after detecting the $2^{nd}$ fault, the MMIC triggers the FSI hardwire flag bit, for example, sets the FSI hardwire flag bit to a high level (for example, 1).

Herein, the second CPU executes tasks in serial, and detecting the FSI hardwire flag is one of the tasks. Generally, a task of processing an FSI hardwire flag interrupt has a highest priority. For example, the second CPU needs to execute a task 1 (that is, detecting the FSI hardwire flag), a task 2, and a task 3, and the second CPU may run the three tasks in sequence based on priorities. For example, a priority of the task 1 is higher than that of the task 2, and a priority of the task 2 is higher than that of the task 3. The first CPU runs the task 1, the task 2, and the task 3 in sequence. When detecting that the task 1 occurs, the second CPU may enter the task 1, that is, execute a procedure of the task 1.

When detecting the FSI hardwire flag, the second CPU in the MCU reads the information in the fault register from the RAM in the MCU, and reads, from a cache (cache) of the first CPU, the first fault information in the information in the fault register. In addition, when determining that the first fault has been processed by the first CPU, the second CPU shields the first fault information, and identifies the second fault information from the information in the fault register.

For a possible implementation in which the second CPU identifies the second fault information from the information in the fault register, refer to the foregoing related descriptions. Details are not described herein again.

Implementation 2: The second CPU periodically queries the RAM in the MCU, and obtains the second fault information from the RAM in the MCU.

Based on Implementation 2, the second CPU periodically reads the information in the fault register from the RAM in the MCU, and reads, from a cache of the first CPU, the first fault information in the information in the fault register. In addition, when determining that the first fault has been processed by the first CPU, the second CPU shields the first fault information, and identifies the second fault information from the information in the fault register.

For an example in which the second CPU identifies the second fault information from the read information in the fault register, refer to related descriptions in Implementation 1. Details are not described herein again.

In a possible implementation, the second CPU may periodically query the RAM in the MCU, for example, query the RAM every 1 ms.

Step 510: The second CPU in the MCU processes the second fault.

For step 510, refer to step 507. Details are not described herein again.

It can be learned from step 501 to step 510 that the first CPU processes the first fault, and the second CPU processes the second fault, so that the first fault and the second fault can be processed in time. In addition, a manner of sending the information in the fault register by multiplexing the LVDS channel is a heterogeneous redundancy manner, which helps avoid a case in which all communication channels fail because a single SPI communication manner is used.

Figure 6:
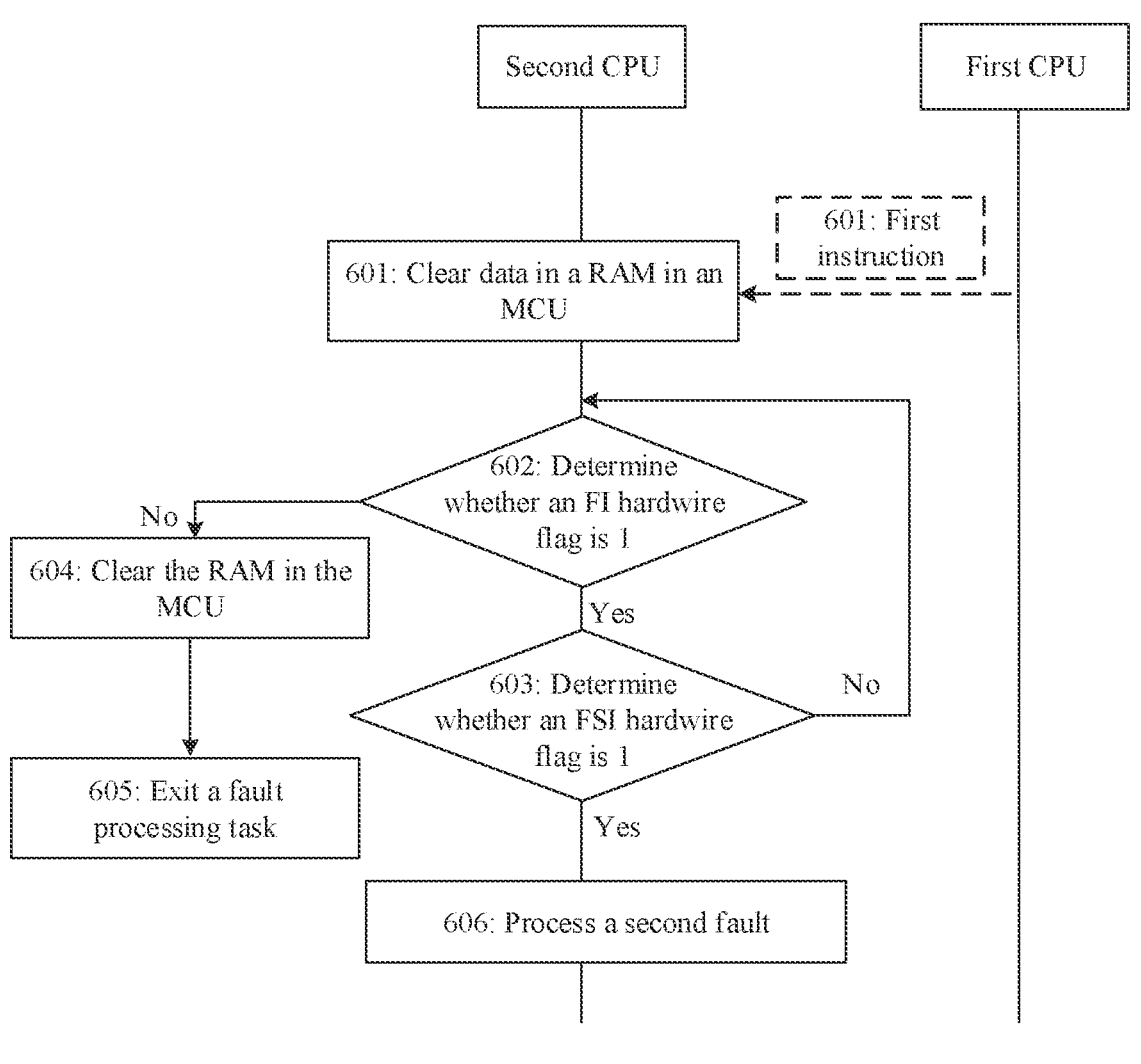
FIG. 6 is a schematic flowchart of still another information transmission method according to this application.

After step 502, that is, after receiving the first instruction, the second CPU may start a fault processing task in response to the first instruction. FIG. 6 is a schematic flowchart of another information transmission method according to this application. In the method, for example, that an FI hardwire flag bit is 1 indicates an FI hardwire flag interrupt (that is, an FI hardwire flag is triggered), and that an FSI hardwire flag bit is 1 indicates an FSI hardwire flag interrupt (that is, an FSI hardwire flag is triggered).

Step 601: A second CPU clears data in a RAM in an MCU.

Herein, the second CPU may send a data clear instruction to the RAM in the MCU, and the RAM in the MCU clears stored data based on the data clear instruction. In this way, original data in the RAM in the MCU can be prevented from interfering with a fault interrupt processing task.

It should be noted that after the second CPU receives a first instruction, the RAM in the MCU has not received information about a fault register from an MMIC. In other words, before the information in the fault register is received, the data in the RAM in the MCU is cleared first, so that after receiving the information in the fault register, the RAM in the MCU stores only the information in the fault register.

Step 602: The second CPU determines whether the FI hardwire flag is 1; and performs step 603 if the FI hardwire flag is 1; or performs step 604 if the FI hardwire flag is not 1.

Herein, if the FI hardwire flag is 1, it indicates that a first CPU does not complete processing of a first fault. If a second fault occurs in the MMIC, the first CPU cannot process the second fault in time. Therefore, the second CPU needs to process the second fault. If it is determined that the FI hardwire flag is 0, it indicates that the first CPU has processed the first fault. In this case, if the second fault occurs in the MMIC, the first CPU may directly process the second fault, and the second CPU does not need to process the second fault. Herein, the second CPU may perform subsequent step 604 and step 605.

Step 603: The second CPU determines whether the FSI hardwire flag is 1; and performs the following step 606 if the FSI hardwire flag is 1; or returns to perform step 602 if the FSI hardwire flag is not 1.

Herein, if the FSI hardwire flag is 1, it indicates that the second CPU does not complete processing of the second fault, and therefore the second CPU needs to process the second fault, that is, perform step 606. If the FSI hardwire flag is 0, it indicates that the second fault has been processed, and the second CPU returns to step 602 to wait for a new fault processing task again.

Step 604: The second CPU clears the RAM in the MCU. Step 605 is performed after step 604.

Step 605: The second CPU exits a fault processing task.

Step 606: The second CPU processes the second fault.

Figure 7:
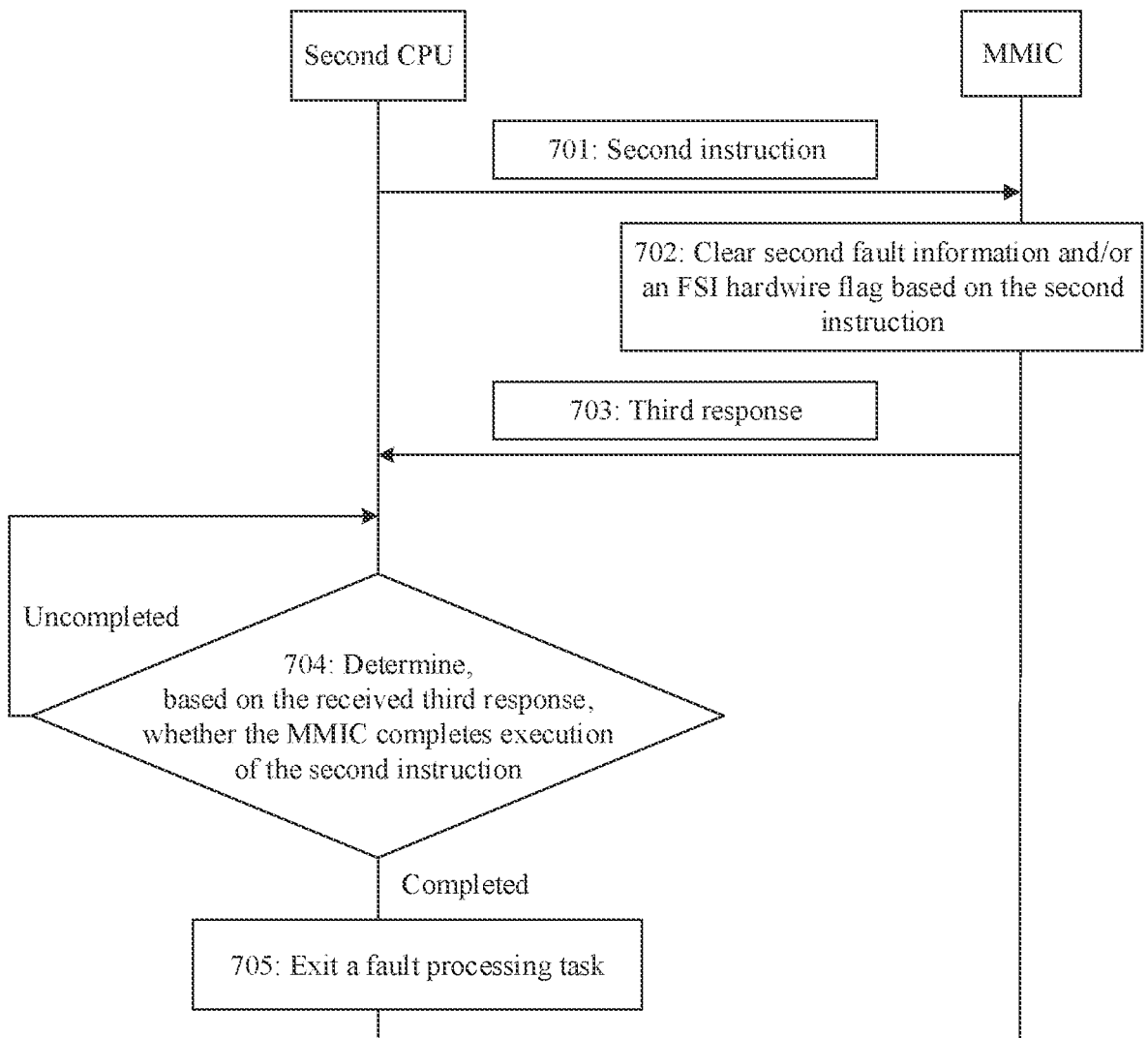
FIG. 7 is a schematic flowchart of still another information transmission method according to this application.

If the second CPU obtains the second fault information based on Implementation 1, after completing processing of the second fault, the second CPU further needs to clear the FSI hardwire flag corresponding to the second fault and/or the second fault information in the information in the fault register. Refer to the description in FIG. 7.

Step 701. The second CPU may send a second instruction to the MMIC. Correspondingly, the MMIC receives second instruction from the second CPU by using the SPI.

In a possible implementation, the second CPU may send the second instruction to the MMIC through an SPI.

Herein, the second instruction is used to instruct the MMIC to clear the FSI hardwire flag and/or the second fault information. With reference to FIG. 3, the CPU 1302 may send the second instruction to the control unit 3021 in the MMIC 302. The second instruction is used to instruct the control unit 3021 to clear the second fault information and/or clear the FSI hardwire flag. For example, the control unit 3021 may restore the second fault information 1 to 0, and set the FSI hardwire flag bit to a low level (for example, 0).

Step 702: The MMIC may clear, based on the second instruction, the second fault information included in the information in the fault register and/or the FSI hardwire flag.

With reference to step 509 in FIG. 5, for example, the information in the fault register is 00100100000000000000000000 00000, and the second fault information is the third bit in the information in the fault register. The MMIC may restore 1 in the third bit to 0 based on the second instruction. For another example, the information in the fault register is 00000010001000000000000000000000, and the second fault information is the tenth bit in the information in the fault register. The MMIC may restore 1 in the tenth bit to 0 based on the second instruction.

Herein, if "the FI hardwire flag is 1" indicates interruption, the MMIC may restore the FI hardwire flag to 0 based on the second instruction.

Step 703: The MMIC may send a third response to the second CPU.

In a possible implementation, the MMIC may send the third response to the second CPU through an SPI.

Herein, the third response includes an execution process of the second instruction. For example, the execution process of the second instruction may be identified by 0 and 1, where 0 indicates that execution of the second instruction is uncompleted, and 1 indicates that execution of the second instruction is completed. It should be noted that execution of the second instruction may alternatively be represented by another identifier, provided that the identifier can distinguish whether the second instruction is completed or uncompleted. This is not limited in this application.

It should be understood that the second CPU needs to determine a process of executing the second instruction by the MMIC. Therefore, the MMIC periodically feeds back an execution process of the second instruction to the second CPU. For example, the MMIC may feed back the execution process of the second instruction to the second CPU once every 10 us.

Step 704: The second CPU determines, based on the received third response, whether the MMIC completes execution of the second instruction; and performs step 705 if execution of the second instruction is completed; or if execution of the second instruction is uncompleted, continues to detect the execution process of the second instruction, that is, cyclically performs step 704.

For example, the second CPU sends the second instruction at a moment t1, and views the third response at a moment t2. The moment t1 and the moment t2 may be preset. That is, the CPU usually sends an instruction and receives a response based on fixed duration.

Step 705: The second CPU exits a fault processing task.

It can be learned from step 701 to step 705 that, after completing processing of the second fault, the second CPU clears, in time, the FSI hardwire flag and/or the second fault information corresponding to the second fault, so that a newly generated fault can be processed in time in a next task periodicity.

It should be noted that in the foregoing embodiment, execution processes of steps in the first CPU are serial, execution processes of steps in the second CPU are serial, and execution processes of the first CPU and the second CPU may be serial or parallel. It should be noted that the execution processes of the foregoing steps are described for clearly explaining a solution. Based on a requirement in an actual scenario, one or more steps in the foregoing steps may not need to be performed, or a plurality of steps may be combined for execution. This depends on specific execution in an actual scenario.

It may be understood that, to implement the functions in the foregoing embodiments, the control apparatus includes corresponding hardware structures and/or software modules for performing the functions. A person skilled in the art should be easily aware that, modules and method steps in the examples described with reference to embodiments disclosed in this application can be implemented in this application by hardware or a combination of hardware and computer software. Whether a function is performed by hardware or hardware driven by computer software depends on particular application scenarios and design constraint conditions of the technical solutions.

Figure 8:
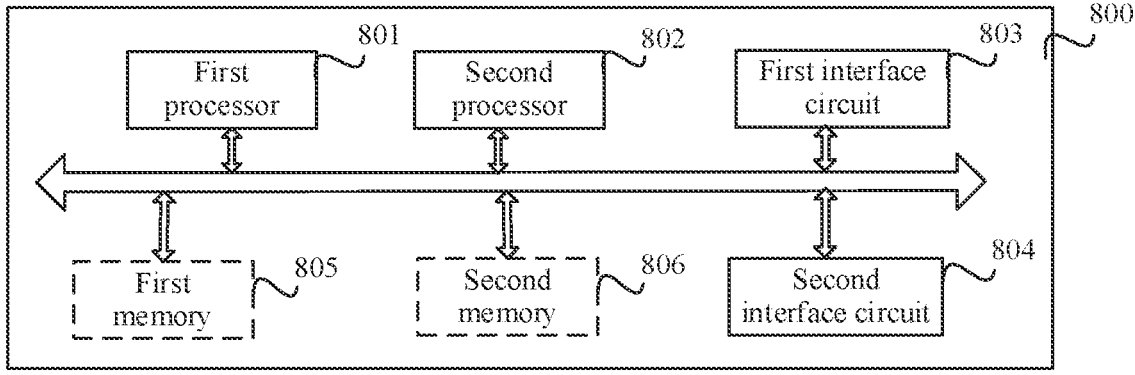
FIG. 8 is a schematic diagram of a structure of a control apparatus according to this application.

Based on the foregoing content and a same concept, FIG. 8 is a schematic diagram of a possible structure of a control apparatus according to this application. The control apparatus can be configured to implement functions of the control apparatus in the foregoing method embodiments, and therefore beneficial effects of the foregoing method embodiments can also be implemented. In this application, the control apparatus may be the MCU 301 shown in FIG. 3.

As shown in FIG. 8, the control apparatus 800 includes a first processor 801 and a second processor 802. Further, the control apparatus 800 may include a first interface circuit 803 and a second interface circuit 804. Optionally, the control apparatus 800 may further include a first memory 805 and/or a second memory 806. The first memory 805 may be configured to store instructions executed by the first processor 801 and the second processor 802. The second memory 806 may be configured to store second fault information received by the control apparatus 800. The control apparatus 800 may be configured to implement functions of the control apparatus or the MCU in the method embodiment shown in FIG. 4, FIG. 5, FIG. 6, or the figure. It should be noted that the first interface circuit 803 may also be referred to as a first input/output interface 803, and the second interface circuit 804 may also be referred to as a second input/output interface 804. The interface circuit is introduced herein to better describe a hardware structure of a product. A person skilled in the art may understand that the interface circuit may be a hardware circuit or a logic circuit that implements a corresponding channel. "By using an interface circuit corresponding to a channel" appears in the following may also be directly understood or replaced with "through a channel".

When the control apparatus 800 is configured to implement functions of the control apparatus in the method embodiment shown in FIG. 4, the first processor 801 is configured to obtain first fault information of an electromagnetic signal transceiver apparatus by using the first interface circuit 803 corresponding to a first channel, where the first fault information corresponds to a first fault; and the second processor 802 is configured to obtain second fault information of the electromagnetic signal transceiver apparatus, where the second fault information corresponds to a second fault. The second fault information is from the electromagnetic signal transceiver apparatus and is transmitted by using the second interface circuit 804 corresponding to a second channel.

More detailed descriptions of the first processor 801 and the second processor 802 may be directly obtained by referring to related descriptions in the method embodiment shown in FIG. 4. Details are not described one by one herein again.

Figure 9:
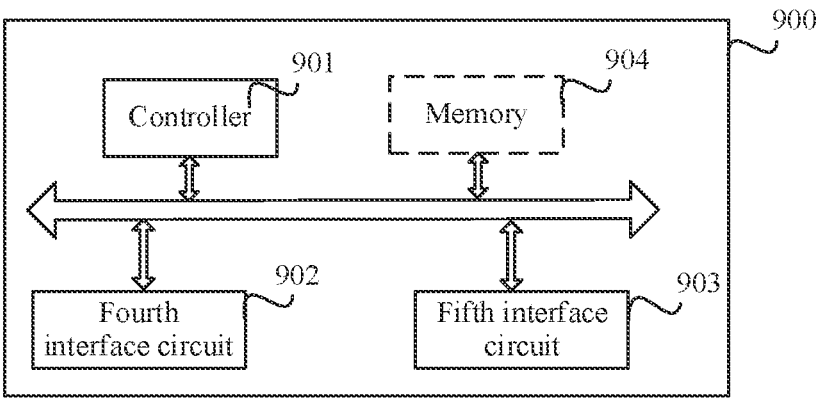
FIG. 9 is a schematic diagram of a structure of an electromagnetic signal transceiver apparatus according to this application.

Based on the foregoing content and a same concept, FIG. 9 is a schematic diagram of a possible structure of an electromagnetic signal transceiver apparatus according to this application. The electromagnetic signal transceiver apparatuses can be configured to implement functions of the electromagnetic signal transceiver apparatus in the foregoing method embodiments, and therefore beneficial effects of the foregoing method embodiments can also be implemented. In this application, the electromagnetic signal transceiver apparatus may be the MMIC 302 shown in FIG. 3.

As shown in FIG. 9, the electromagnetic signal transceiver apparatus 900 includes a controller 901, and may further include a fourth interface circuit 902 and a fifth interface circuit 903. Optionally, the control apparatus 900 may further include a memory 904, and the memory 904 may be configured to store fault information. It should be noted that instructions executed by the controller 901 are usually firmware (firmware) programs, that is, the instructions executed by the controller 901 are usually fixed in the electromagnetic signal transceiver apparatus 900. The electromagnetic signal transceiver apparatus 900 is configured to implement functions of the electromagnetic signal transceiver module or the MMIC in the method embodiment shown in FIG. 4, FIG. 5, FIG. 6, or the figure. It should be noted that the fourth interface circuit 902 may also be referred to as a fourth input/output interface 902, and the fifth interface circuit 903 may also be referred to as a fifth input/output interface 903. For explanation of the interface circuit herein, refer to the foregoing description. Further, optionally, the memory 904 may include a register.

When the electromagnetic signal transceiver apparatus 900 is configured to implement functions of the electromagnetic signal transceiver apparatus in the method embodiment shown in FIG. 4, the controller 901 is configured to detect a first fault, and transmit first fault information to a control apparatus by using the fourth interface circuit 902 corresponding to a first channel, where the first fault information corresponds to the first fault; and the controller 901 is further configured to detect a second fault, and transmit second fault information to the control apparatus by using the fifth interface circuit 903 corresponding to a second channel, where the second fault information corresponds to the second fault.

More detailed descriptions of the controller 901 may be directly obtained by referring to related descriptions in the method embodiment shown in FIG. 4. Details are not described one by one herein again.

Figure 10:
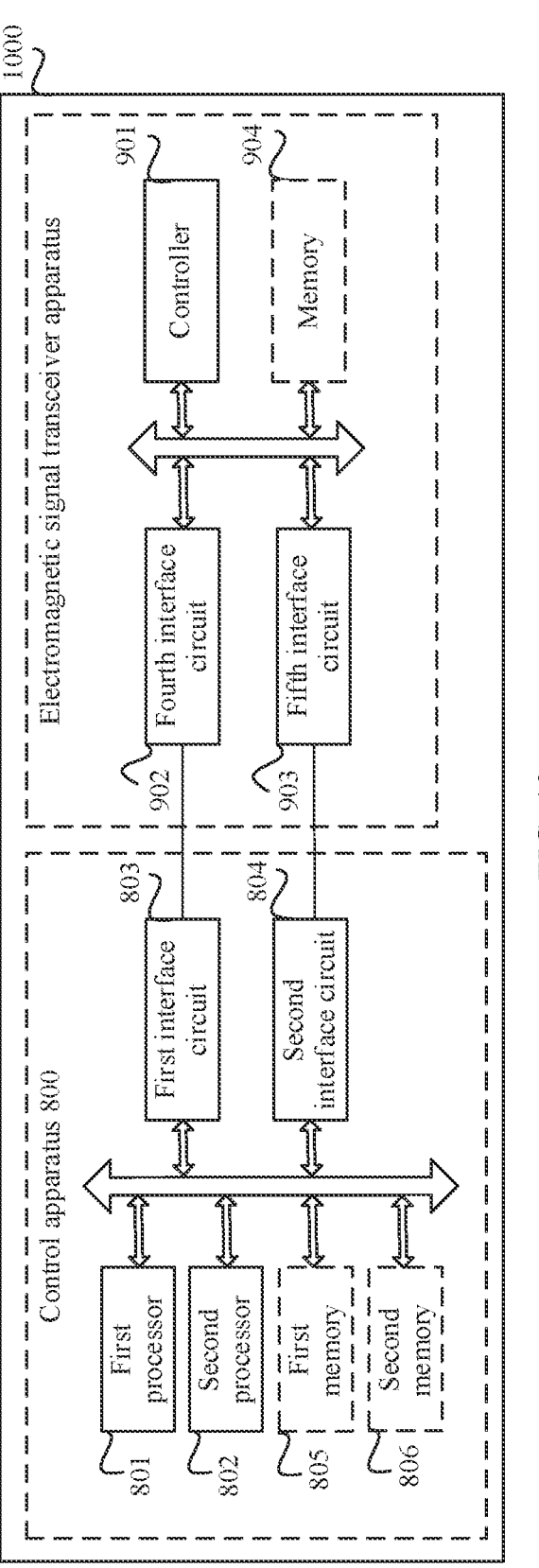
FIG. 10 is a schematic diagram of a structure of a signal processing device according to this application.

Based on the foregoing content and a same concept, as shown in FIG. 10, this application further provides a signal processing device 1000. The signal processing device 1000 may include at least one of the control apparatus 800 or the electromagnetic signal transceiver apparatus 900. For the control apparatus 800, refer to related descriptions in FIG. 8. For the electromagnetic signal transceiver apparatus 900, refer to related descriptions in FIG. 9.

When the signal processing device 1000 is configured to implement the method shown in FIG. 4, the control apparatus 800 is configured to perform functions of the control apparatus, and the electromagnetic signal transceiver apparatus 900 is configured to perform functions of the electromagnetic signal transceiver apparatus.

It may be understood that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The general-purpose processor may be a microprocessor or may be any conventional processor. The controller may be, for example, a control unit (control unit) in a millimeter-wave radar system, an application-specific integrated circuit (application-specific integrated circuit, ASIC), a field programmable gate array (field programmable gate array, FPGA) or another programmable logic device, a transistor logic device, a hardware component, or any combination thereof.

The method steps in embodiments of this application may be implemented by using hardware, or may be implemented by executing software instructions by the processor. The software instructions may include a corresponding software module. The software module may be stored in a random access memory (random access memory, RAM), a flash memory, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. An example storage medium is coupled to the processor, so that the processor can read information from the storage medium and write information into the storage medium. Certainly, the storage medium may be a component of the processor. The processor and the storage medium may be located in an ASIC. In addition, the ASIC may be located in a control apparatus or an electromagnetic signal transceiver apparatus. Certainly, the processor and the storage medium may exist in a network device or a terminal device as a discrete component.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, all or some of the procedures or functions in embodiments of this application are performed. The computer may be a general-purpose computer, a dedicated computer, a computer network, a network device, user equipment, or another programmable apparatus. The computer programs or instructions may be stored in a computer-readable storage medium or may be transmitted from one computer-readable storage medium to another computer-readable storage medium. For example, the computer programs or instructions may be transmitted from one website, computer, server, or data center to another website, computer, server, or data center in a wired or wireless manner. The computer-readable storage medium may be any available medium accessible by a computer or a data storage device, such as a server or a data center, that integrates one or more available media. The available medium may be a magnetic medium, for example, a floppy disk, a hard disk, or a magnetic tape; may be an optical medium, for example, a digital video disc (digital video disc, DVD); or may be a semiconductor medium, for example, a solid state drive (solid state drive, SSD).

In embodiments of this application, unless otherwise stated or there is a logic conflict, terms and/or descriptions between different embodiments are consistent and may be mutually referenced, and technical features in different embodiments may be combined based on an internal logical relationship of the embodiments, to form a new embodiment.

In this application, the word "example" is used to represent giving an example, an illustration, or a description. Any embodiment or design solution described as an "example" in this application should not be explained as being more preferred or having more advantages than another embodiment or design solution. Alternatively, this may be understood as that use of the word "example" is intended to present a concept in a specific manner, and does not constitute a limitation on this application.

It may be understood that various numerical numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes. The terms "first", "second", and another similar expression are used to distinguish between similar objects but are unnecessarily used to describe a specific order or sequence. In addition, the terms "include", "have", and any variant thereof are intended to cover non-exclusive inclusion, for example, include a series of steps or modules. Methods, systems, products, or devices are unnecessarily limited to those steps or modules that are clearly listed, but may include other steps or modules that are not clearly listed or that are inherent to these processes, methods, products, or devices.

Apparently, a person skilled in the art can make various modifications and variations to this application without departing from the protection scope of this application. This application is intended to cover these modifications and variations of this application provided that they fall within the scope of the claims of this application and an equivalent technology thereof.

What is claimed is:

1. An information transmission method, applied to a control apparatus, wherein the control apparatus comprises a first processor and a second processor, and the information transmission method comprises:

obtaining, by the first processor, first fault information of an electromagnetic signal transceiver apparatus through a first channel, wherein the first fault information corresponds to a first fault, and the first channel is a control channel, and wherein the obtaining, by the first processor, first fault information of an electromagnetic signal transceiver apparatus through a first channel comprises:

receiving, by the first processor, a first fault indication (FI) hardwire flag from the electromagnetic signal transceiver apparatus, wherein the first FI hardwire flag is used to indicate the first fault;

sending, by the first processor, a first request message to the electromagnetic signal transceiver apparatus, wherein the first request message is used to request the first fault information; and receiving, by the first processor, the first fault information from the electromagnetic signal transceiver apparatus through the first channel; and obtaining, by the second processor, second fault information of the electromagnetic signal transceiver apparatus, wherein the second fault information corresponds to a second fault, and the first fault and the second fault occur in a same task periodicity, and wherein:

the second fault information is from the electromagnetic signal transceiver apparatus and is transmitted through a second channel, and the second channel is a data channel.

2. The information transmission method according to claim 1, wherein at least one of the following applies: (1) the first channel is a serial peripheral interface (SPI), or (2) the second channel is a low voltage differential signaling (LVDS) channel.

3. The information transmission method according to claim 1, wherein the control apparatus further comprises a first memory, and the second fault information is stored in the first memory; and the obtaining, by the second processor, second fault information of the electromagnetic signal transceiver apparatus comprises:

obtaining, by the second processor, the second fault information from the first memory.

4. The information transmission method according to claim 3, wherein the obtaining, by the second processor, the second fault information from the first memory comprises:

periodically querying, by the second processor, the first memory; and obtaining, by the second processor, the second fault information from the first memory.

5. The information transmission method according to claim 3, wherein the obtaining, by the second processor, the second fault information from the first memory comprises:

detecting, by the second processor, a second fault indication (FI) hardwire flag; and obtaining the second fault information from the first memory, wherein the second FI hardwire flag is used to indicate the second fault.

6. The information transmission method according to claim 5, wherein the information transmission method further comprises:

processing, by the second processor, the second fault in response to at least one of uncompleted processing of the first fault, a first instruction, or detection of the second FI hardwire flag, wherein the first instruction is used to instruct the second processor to process the second fault.

7. The information transmission method according to claim 3, wherein the obtaining, by the second processor, the second fault information from the first memory comprises:

obtaining, by the second processor, information in a fault register of the electromagnetic signal transceiver apparatus; and determining, by the second processor, the second fault information based on the information in the fault register.

8. The information transmission method according to claim 5, wherein the information transmission method further comprises:

sending, by the second processor, a second instruction to the electromagnetic signal transceiver apparatus, wherein the second instruction is used to instruct the electromagnetic signal transceiver apparatus to clear at least one of the second FI hardwire flag or the second fault information.

9. The information transmission method according to claim 1, wherein the information transmission method further comprises:

detecting, by the first processor, a first fault indication (FI) hardwire flag, wherein the first FI hardwire flag is used to indicate the first fault; and sending, by the first processor, a first instruction to the second processor, wherein the first instruction is used to instruct the second processor to process the second fault.

10. An information transmission method, comprising:

detecting, by an electromagnetic signal transceiver apparatus, a first fault;

sending, by the electromagnetic signal transceiver apparatus, a first fault indication (FI) hardwire flag to a first processor of a control apparatus, wherein the first FI hardwire flag is used to indicate that the first fault is generated;

receiving, by the electromagnetic signal transceiver apparatus, a first request message from the first processor of the control apparatus to request first fault information;

transmitting, by the electromagnetic signal transceiver apparatus, the first fault information to the control apparatus through a first channel, wherein the first fault information corresponds to the first fault, and the first channel is a control channel;

detecting, by the electromagnetic signal transceiver apparatus, a second fault, wherein the first fault and the second fault occur in a same task periodicity; and transmitting, by the electromagnetic signal transceiver apparatus, second fault information to the control apparatus through a second channel, wherein the second fault information corresponds to the second fault, and the second channel is a data channel.

11. The information transmission method according to claim 10, wherein at least one of the following applies: (1) the first channel is a serial peripheral interface (SPI), or (2) the second channel is a low voltage differential signaling (LVDS) channel.

12. The information transmission method according to claim 10, wherein the transmitting, by the electromagnetic signal transceiver apparatus, second fault information to the control apparatus through a second channel comprises:

transmitting, by the electromagnetic signal transceiver apparatus, the second fault information to a first memory in the control apparatus through the second channel.

13. The information transmission method according to claim 10, wherein the information transmission method further comprises:

sending, by the electromagnetic signal transceiver apparatus, a second fault indication (FI) hardwire flag to a second processor in the control apparatus, wherein the second FI hardwire flag is used to indicate the second fault.

14. The information transmission method according to claim 13, wherein the information transmission method further comprises:

receiving, by the electromagnetic signal transceiver apparatus, a second instruction from the second processor; and clearing, by the electromagnetic signal transceiver apparatus, at least one of the second FI hardwire flag or the second fault information based on the second instruction.

15. The information transmission method according to claim 10, further comprising:

obtaining, by the electromagnetic signal transceiver apparatus, the first fault information in a fault register based on the first request message.

16. A control apparatus, comprising a first processor, a second processor, a first interface circuit, and a second interface circuit, wherein:

the first processor is configured to obtain first fault information of an electromagnetic signal transceiver apparatus by using the first interface circuit corresponding to a first channel, wherein the first fault information corresponds to a first fault, and the first channel is a control channel, and wherein obtaining the first fault information of the electromagnetic signal transceiver apparatus through the first channel comprises:

receiving, by the first processor, a first fault indication (FI) hardwire flag from the electromagnetic signal transceiver apparatus, wherein the first FI hardwire flag is used to indicate the first fault;

sending, by the first processor, a first request message to the electromagnetic signal transceiver apparatus, wherein the first request message is used to request the first fault information; and receiving, by the first processor, the first fault information from the electromagnetic signal transceiver apparatus through the first channel;

the second processor is configured to obtain second fault information of the electromagnetic signal transceiver apparatus, wherein the second fault information corresponds to a second fault, and the first fault and the second fault occur in a same task periodicity; and the second fault information is from the electromagnetic signal transceiver apparatus and is transmitted by using the second interface circuit corresponding to a second channel, and the second channel is a data channel.

17. The control apparatus according to claim 16, wherein at least one of the following applies: (1) the first channel is a serial peripheral interface (SPI), or (2) the second channel is a low voltage differential signaling (LVDS) channel.

18. The control apparatus according to claim 16, wherein the control apparatus further comprises a first memory, and the second fault information is stored in the first memory; and the second processor is configured to:

obtain the second fault information from the first memory.

19. The control apparatus according to claim 18, wherein the second processor is configured to:

periodically query the first memory; and obtain the second fault information from the first memory.

20. The control apparatus according to claim 18, wherein obtaining the second fault information from the first memory comprises:

obtaining, by the second processor, information in a fault register of the electromagnetic signal transceiver apparatus; and determining, by the second processor, the second fault information based on the information in the fault register.

* * * * *